United States Patent
Manolakos et al.

(10) Patent No.: US 11,206,065 B2
(45) Date of Patent: *Dec. 21, 2021

(54) DYNAMIC ADJUSTMENT OF TRANSMISSION PROPERTIES WITH CONTINUOUS PRECODING

(71) Applicant: QUALCOMM Incorporated, San Diego, CA (US)

(72) Inventors: Alexandros Manolakos, San Diego, CA (US); Yu Zhang, Beijing (CN); Jing Jiang, San Diego, CA (US); June Namgoong, San Diego, CA (US); Wanshi Chen, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/557,776

(22) Filed: Aug. 30, 2019

(65) Prior Publication Data

US 2020/0052750 A1     Feb. 13, 2020

Related U.S. Application Data

(63) Continuation of application No. 15/608,670, filed on May 30, 2017, now Pat. No. 10,404,340.

(Continued)

(51) Int. Cl.
| | |
|---|---|
| *H04B 7/0456* | (2017.01) |
| *H04L 5/00* | (2006.01) |
| *H04B 7/0413* | (2017.01) |

(52) U.S. Cl.
CPC ......... *H04B 7/0482* (2013.01); *H04B 7/0413* (2013.01); *H04L 5/0007* (2013.01); *H04L 5/0023* (2013.01); *H04L 5/0048* (2013.01)

(58) Field of Classification Search
CPC ... H04B 7/0413; H04B 7/0482; H04L 5/0007; H04L 5/0023; H04L 5/0048
See application file for complete search history.

(56) References Cited

U.S. PATENT DOCUMENTS

| | | | |
|---|---|---|---|
| 9,019,902 | B2 | 4/2015 | Damnjanovic et al. |
| 9,148,204 | B2 | 9/2015 | Bhattad et al. |
| 10,404,340 | B2 | 9/2019 | Manolakos et al. |
| 10,461,824 | B2 | 10/2019 | Zhang et al. |

(Continued)

FOREIGN PATENT DOCUMENTS

| | | |
|---|---|---|
| CN | 102884856 A | 1/2013 |
| CN | 103283171 A | 9/2013 |

(Continued)

OTHER PUBLICATIONS

International Search Report and Written Opinion—PCT/US2017/047809—ISA/EPO—dated Nov. 6, 2017.

(Continued)

*Primary Examiner* — Stephen J Clawson
(74) *Attorney, Agent, or Firm* — Loza & Loza, LLP/Qualcomm

(57) ABSTRACT

Aspects of the disclosure relate to a transmitting device, which may explicitly or implicitly signal the use of continuous precoding for a resource block (RB) cluster. For example, the transmitting device may implicitly indicate that continuous precoding is applied to an RB cluster by dynamically controlling one or more parameters of a transmission over those RBs. Further, when continuous precoding is applied to an RB cluster, the transmitting device may explicitly or implicitly signal the dynamic control over one or more transmission properties, with an aim to maximize the benefits of such continuous precoding. Other aspects, embodiments, and features are also claimed and described.

30 Claims, 13 Drawing Sheets

Related U.S. Application Data

(60) Provisional application No. 62/406,920, filed on Oct. 11, 2016.

(56) References Cited

U.S. PATENT DOCUMENTS

| | | | |
|---|---|---|---|
| 2010/0272201 A1 | 10/2010 | Nakao et al. | |
| 2013/0273954 A1 | 10/2013 | Ji et al. | |
| 2014/0307645 A1 | 10/2014 | Ji et al. | |
| 2015/0065340 A1* | 3/2015 | Hatakeyama | B01J 31/38 502/159 |
| 2016/0065340 A1* | 3/2016 | Li | H04B 7/0456 370/329 |
| 2018/0102821 A1 | 4/2018 | Manolakos et al. | |
| 2018/0175959 A1* | 6/2018 | Ravichandran | H04J 11/005 |

FOREIGN PATENT DOCUMENTS

| | | |
|---|---|---|
| CN | 104104472 A | 10/2014 |
| JP | 2016518758 A | 6/2016 |
| JP | 2016521026 A | 7/2016 |
| WO | 2010056763 | 5/2010 |
| WO | 2010080631 A2 | 7/2010 |
| WO | 2011163273 | 12/2011 |

OTHER PUBLICATIONS

Samsung: "Discussion on RB Bundling for DM-RS", 3GPP TSG RAN WG1 Meeting #59bis, R1-100104, Valencia, Spain, Jan. 18, 2010-Jan. 22, 2010, 4 Pages, Jan. 13, 2010, Internet URL: http://www.3gpp.org/ftp/tsg_ran/WG1_RL1/TSGR1_59b/Docs/R1-100104.zip.

Texas Instruments: "On Remaining Issues of PRB Bundling Size", 3GPP TSG RAN WG1 #61bis, R1-103695, Dresden, Germany, Jun. 28, 2010-Jul. 2, 2010, pp. 1-3, Jun. 22, 2010, Internet URL: http://www.3gpp.org/ftp/tsg_ran/WG1_RL1/TSGR1_61b/Docs/R1-103695.zip.

\* cited by examiner

Self-Contained Slots

DYNAMIC ADJUSTMENT OF TRANSMISSION PROPERTIES WITH CONTINUOUS PRECODING

PRIORITY CLAIM

This application is a continuation of U.S. patent application Ser. No. 15/608,670, filed in the United States Patent and Trademark Office on May 30, 2017, issued as U.S. Pat. No. 10,404,340 on Sep. 3, 2019, which claims priority to and the benefit of provisional patent application No. 62/406,920, titled "Dynamic Adjustment of Transmission Properties with Continuous Precoding" and filed in the United States Patent and Trademark Office on Oct. 11, 2016, the entire contents of which are incorporated herein by reference as if fully set forth below in their entirety and for all applicable purposes.

TECHNICAL FIELD

The technology discussed below relates generally to wireless communication systems, and more particularly, to the dynamic adjustment of transmission properties with continuous precoding.

INTRODUCTION

In many existing wireless communication systems, a single device is capable of transmitting one or more data streams from multiple different antennas at the same time. Typically, precoding is applied to the transmitted signals. That is, the transmitted signals are multiplied with different weighting and phase shifting before being transmitted from their respective antennas. This can provide single-stream beamforming, where the same data stream is transmitted over each of the antennas. Here, the linear combined signal transmitted from the multiple antennas results in a directional radiation beam. This is typically referred to as beamforming.

In another example, known as multi-input multi-output (MIMO), a plurality of data streams may be precoded and transmitted from different antennas. By virtue of the spatial diversity provided by the separately located antennas, the total capacity of the channel may be multiplied by the number of layers or streams. Research continues to advance MIMO technologies. For example, multi-user MIMO (MU-MIMO) provides multiple access to a MIMO channel for multiple spatially distributed users with multiple antennas. MU-MIMO can provide significantly improved performance over conventional point-to-point MIMO.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects of the disclosure, a transmitting device may explicitly or implicitly signal the use of continuous precoding for a resource block (RB) cluster. For example, the transmitting device may implicitly indicate that continuous precoding is applied to an RB cluster by dynamically controlling one or more parameters of a transmission over those RBs. Further, when continuous precoding is applied to an RB cluster, the transmitting device may explicitly or implicitly signal the dynamic control over one or more transmission properties, with an aim to maximize the benefits of such continuous precoding.

In one example, a method of wireless communication operable at a scheduled entity is disclosed. The method includes receiving a transmission from a scheduling entity utilizing scheduled resources comprising a cluster of two or more resource blocks. The method further includes determining whether continuous precoding is applied to the scheduled resources. If continuous precoding is not applied to the scheduled resources, the method includes generating a channel estimate based on a first set of one or more transmission parameters. However, if continuous precoding is applied to the scheduled resources, the method includes generating the channel estimate based on a second set of one or more transmission parameters. The method further includes processing the transmission based on the channel estimate.

In another example, a scheduled entity configured for wireless communication is disclosed. The scheduled entity includes a processor, a memory communicatively coupled to the processor, and a transceiver communicatively coupled to the processor. Here, the processor is configured for receiving, via the transceiver, a transmission from a scheduling entity utilizing scheduled resources comprising a cluster of two or more resource blocks. The processor is further configured for determining whether continuous precoding is applied to the scheduled resources. If continuous precoding is not applied to the scheduled resources, the processor is further configured for generating a channel estimate based on a first set of one or more transmission parameters. However, if continuous precoding is applied to the scheduled resources, the processor is further configured for generating the channel estimate based on a second set of one or more transmission parameters. The processor is further configured for processing the transmission based on the channel estimate.

In another example, a scheduled entity configured for wireless communication is disclosed. The scheduled entity includes means for receiving a transmission from a scheduling entity utilizing scheduled resources comprising a cluster of two or more resource blocks. The scheduled entity further includes means for determining whether continuous precoding is applied to the scheduled resources. The scheduled entity further includes means for, if continuous precoding is not applied to the scheduled resources, generating a channel estimate based on a first set of one or more transmission parameters. The scheduled entity further includes means for, if continuous precoding is applied to the scheduled resources, generating the channel estimate based on a second set of one or more transmission parameters. The scheduled entity further includes means for processing the transmission based on the channel estimate.

In another example, a non-transitory computer-readable medium storing computer-executable code is disclosed. The computer-readable medium includes code for causing a scheduled entity to receive a transmission from a scheduling entity utilizing scheduled resources comprising a cluster of two or more resource blocks. The computer-readable medium further includes code for causing a scheduled entity to determine whether continuous precoding is applied to the scheduled resources. The computer-readable medium further includes code for causing a scheduled entity to, if continuous precoding is not applied to the scheduled resources, generate a channel estimate based on a first set of one or more transmission parameters. The computer-readable medium further includes code for causing a scheduled entity to, if continuous precoding is applied to the scheduled resources, generate the channel estimate based on a second set of one or more transmission parameters. The computer-readable medium further includes code for causing a scheduled entity to process the transmission based on the channel estimate.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

For wireless communication systems, different precoding techniques have been investigated. As one example, continuous precoding may refer to a precoding algorithm where the phase and amplitude applied to resource elements that are adjacent in frequency are substantially similar to one another (e.g., not discontinuous). As another example, continuous precoding may refer to a precoding algorithm where the phase and amplitude applied to resource elements that are adjacent in time are substantially similar to one another. Of course, some examples of continuous precoding may provide for such continuity in both frequency and time dimensions.

When a precoder utilizes continuous precoding in the frequency dimension, the continuous precoding can provide a frequency-selective precoding capability, while at the same time, reducing any abrupt phase changes in the effective channel. Accordingly, a receiving device can employ a low-cost wideband channel estimation algorithm for joint channel estimation of adjacent resource blocks that contain the adjacent, continuous subcarriers. Such a frequency-selective precoding capability is desired in the art, since a fine-granularity (in the frequency domain) precoding can provide better beamforming gain. However, very fine granularity precoding can cause channel estimation based on demodulation reference signals (DMRS) to be more challenging.

Radio Access Network

Figure 1:
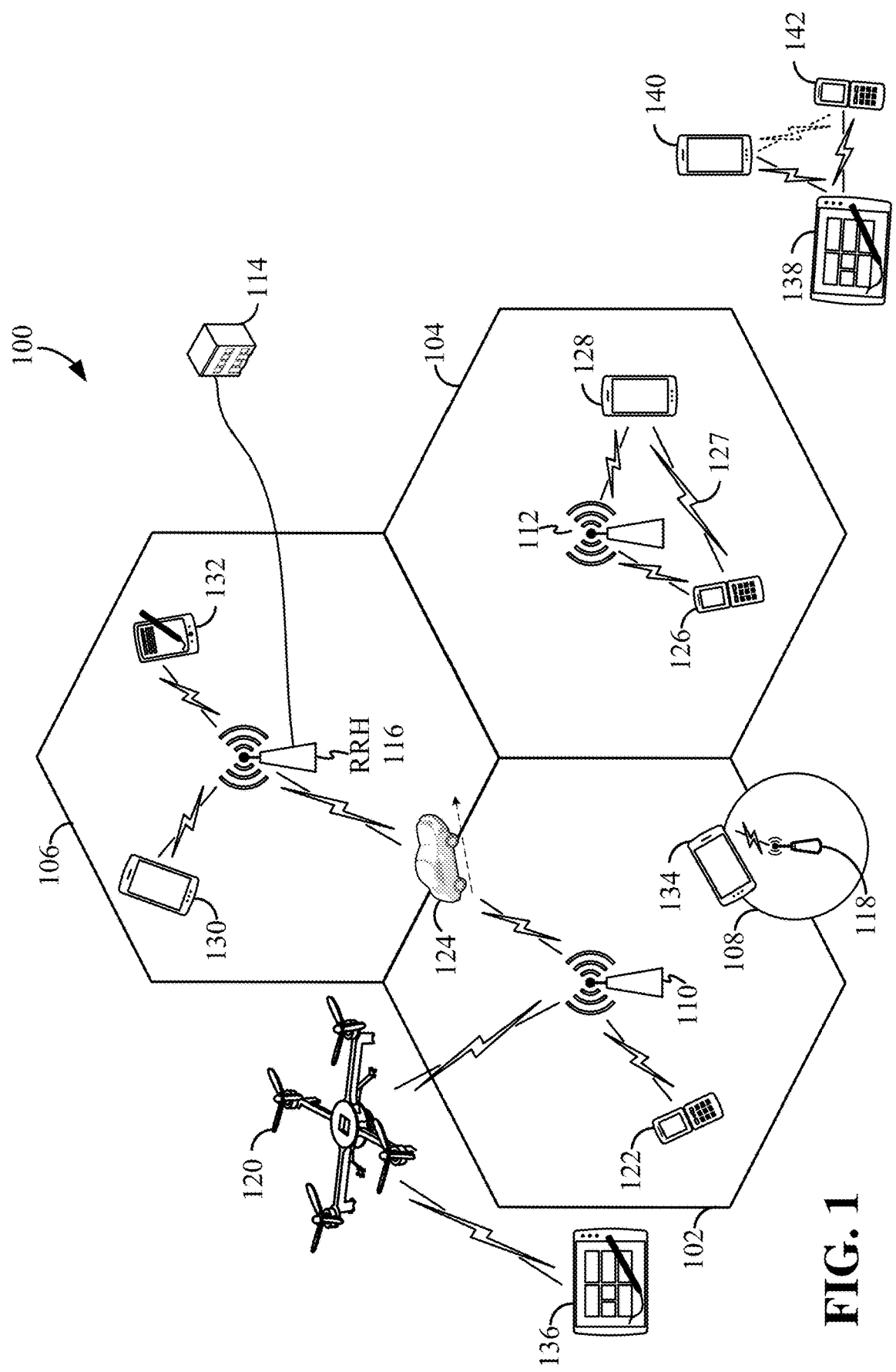
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at the scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Mobility

In the radio access network 100, the ability for a UE to communicate while moving, independent of its location, is referred to as mobility. The various physical channels between the UE and the radio access network are generally set up, maintained, and released under the control of a mobility management entity (MME) or an equivalent component (e.g., an Access and Mobility Management Function (AMF), a Session Management Function (SMF), etc.).

In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

Licensed, Unlicensed, and Shared Spectrum

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) includes a scheduler 942 (see FIG. 9) that allocates resources for communication among some or all devices and equipment within its service area or cell. Within the present disclosure, as discussed further below, the scheduler 942 may be responsible for scheduling, assigning, reconfiguring, and releasing resources for one or more scheduled entities. That is, for scheduled communication, UEs or scheduled entities utilize resources allocated by the scheduler 942. Such scheduled resources may be explicitly communicated from a scheduling entity to a scheduled entity utilizing control signaling, such as a grant. In another example, scheduled resources may be implicitly identified by the respective entities, e.g., utilizing a suitable grantless scheduling mechanism.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
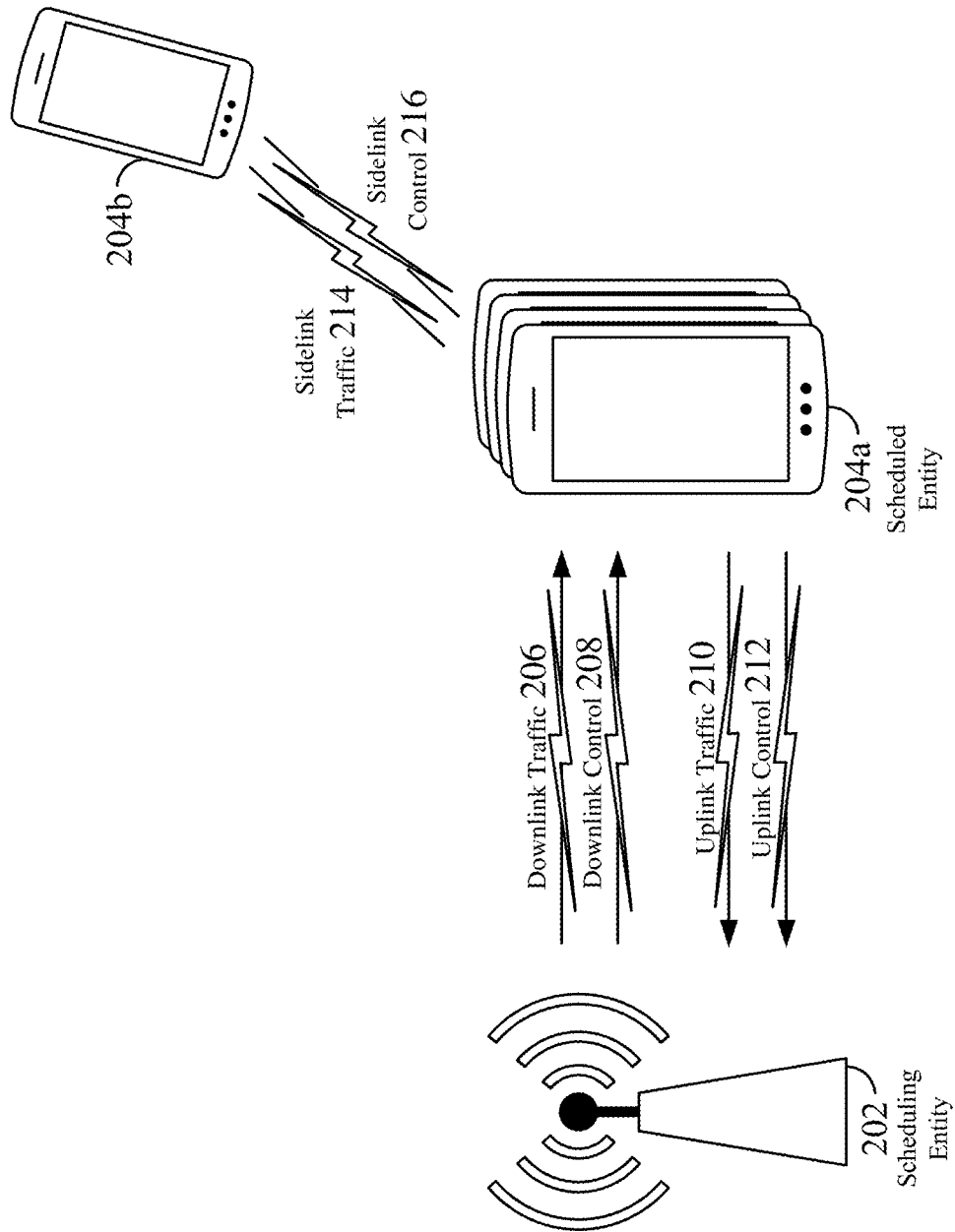
FIG. 2 is a block diagram conceptually illustrating an example of a scheduling entity communicating with one or more scheduled entities according to some embodiments.

Thus, in a wireless communication network with a scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to the base stations 110, 112, 114, and 118. In additional examples, the scheduling entity 202 may correspond to the UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

Sidelink

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

Duplexing

The air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Mimo/Beamforming

Figure 3:
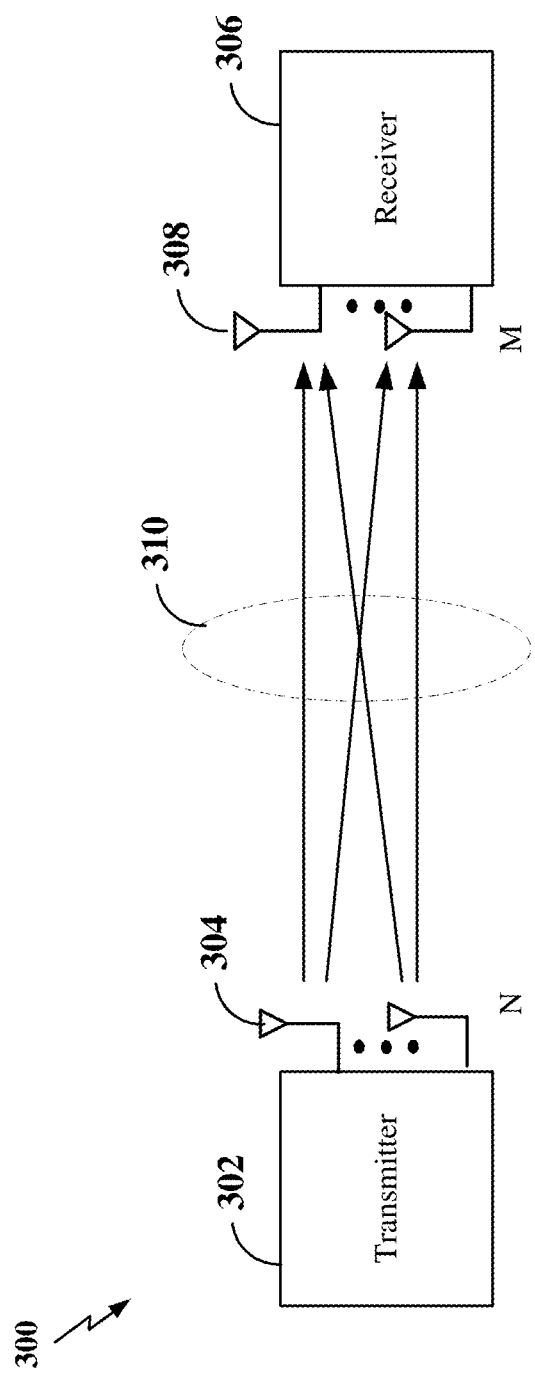
FIG. 3 is a block diagram illustrating a point-to-point MIMO transmission according to an aspect of the present disclosure.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 202, a scheduled entity 204, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Channel Coding

Transmissions over the radio access network 100 may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, Turbo codes, low-density parity check (LDPC) codes, and Polar codes. Various implementations of scheduling entities 202 and scheduled entities 204 may include suitable hardware and capabilities (e.g., an encoder, a decoder, and/or a CODEC) to utilize one or more of these error correcting codes for wireless communication.

Multiplexing/Multiple Access

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), discrete Fourier transform (DFT)-spread OFDMA or single-carrier FDMA (DFT-s-OFDMA or SC-FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

OFDM

Figure 4:
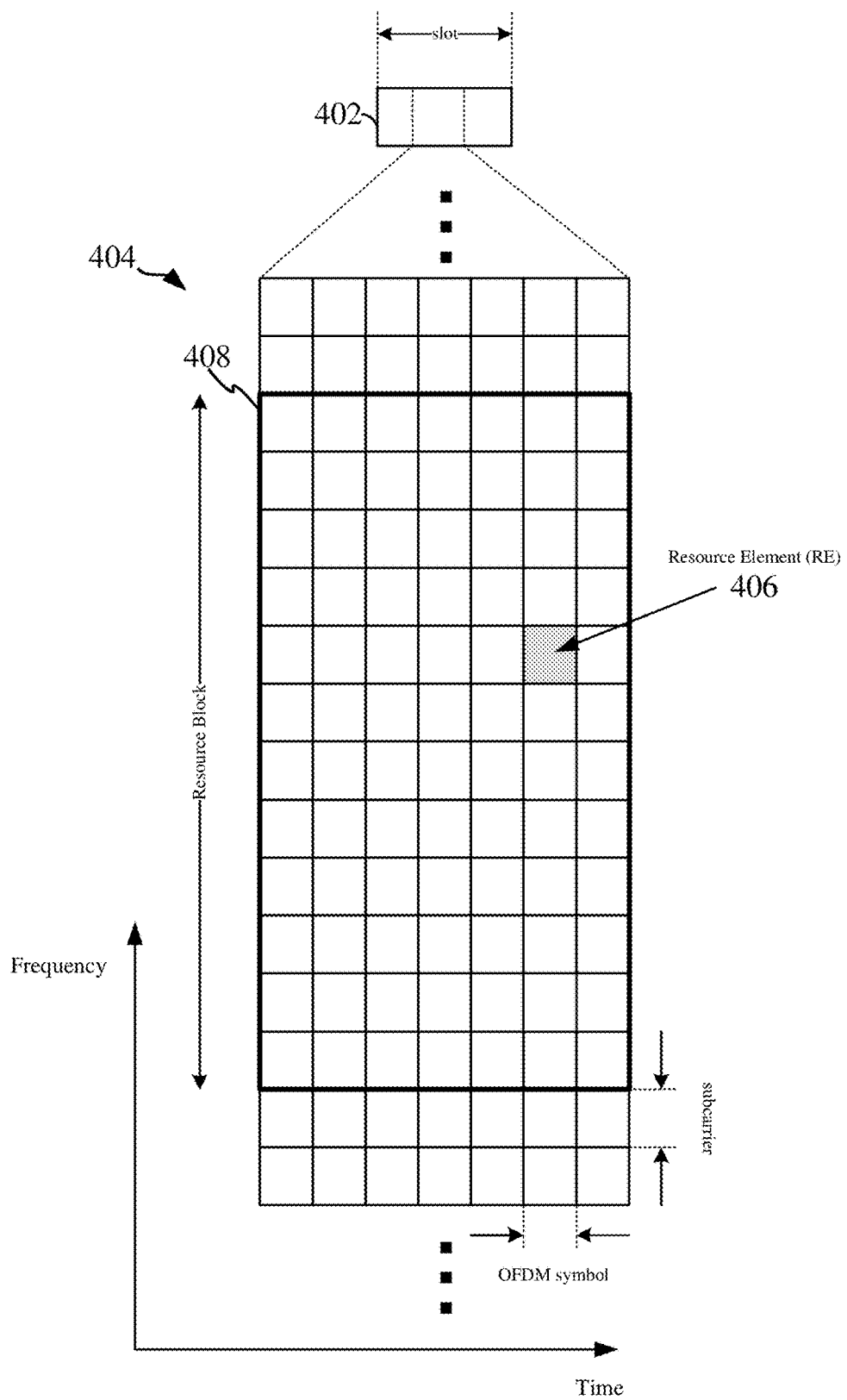
FIG. 4 is a schematic diagram illustrating an orthogonal frequency division multiplexing (OFDM) resource grid according to an aspect of the present disclosure.

Various aspects of the present disclosure will be described with reference to an OFDM waveform, as illustrated in FIG. 4. That is, in a 5G NR radio access network, it is anticipated that OFDM may be utilized for DL transmissions, UL transmissions (OFDMA), and/or sidelink transmissions. Accordingly, it should be understood that various aspects of the present disclosure may be applied to any of these links when utilizing OFDM. Furthermore, in a 5G NR radio access network, a waveform other than OFDM may be utilized for UL and/or sidelink transmissions, such as SC-FDMA. It should be further understood that various aspects of the present disclosure may be applied to an SC-FDMA waveform in substantially the same way as described herein below. That is, while some examples of the present disclosure may focus on a DL OFDM link for clarity, it should be understood that the same principles may be applied to DL, UL, and sidelink, utilizing OFDM as well as SC-FDMA waveforms.

Referring now to FIG. 4, an exemplary DL slot 402 in an OFDM air interface is illustrated. However, as those skilled in the art will readily appreciate, the slot structure for any particular application may vary from the example described here, depending on any number of factors. In this example, a portion of a time slot (slot) 402 is expanded to illustrate a resource grid 404, expanded in time and frequency dimensions. Here, time is in the horizontal direction with units of OFDM symbols; and frequency is in the vertical direction with units of subcarriers.

That is, a resource grid 404 may be used to schematically represent time-frequency resources. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain and, in some examples depending on the length of a cyclic prefix (CP) used in each OFDM symbol, any suitable number of consecutive OFDM symbols in the time domain. An RB may be the smallest unit of resources that can be allocated to a UE. Thus, the more RBs scheduled for a UE, and the higher the modulation scheme chosen for the air interface, the higher the data rate for the UE. In this illustration, the RB 408 is shown as occupying less than the entire bandwidth of the slot 402, with some subcarriers illustrated above and below the RB 408. In a given implementation, the slot 402 may have a bandwidth corresponding to any number of one or more RBs 408. Further, in this illustration, the RB 408 is shown as occupying less than the entire duration of the slot 402, although this is merely one possible example.

As described in further detail below (see, e.g., FIG. 5), one slot 402 may include both UL and DL transmission portions. Within the present disclosure, it is assumed that a single RB such as the RB 408 entirely corresponds to a single direction of communication (either transmission or reception for a given device).

Although not illustrated in FIG. 4, the various REs 406 within the RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device 302 (e.g., the scheduling entity 202) may allocate one or more REs 406 within the RB 408 to carry DL control information 208 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device 302 (e.g., the scheduled entity 204) may utilize one or more REs 406 within the RB 408 to carry UL control information 212 including one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions. UL control information may also include HARQ feedback, channel state feedback (CSF), or any other suitable UL control information.

In addition to control information, the RB 408 may include one or more REs 406 allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within a data region may be configured to carry system information blocks (SIBs), carrying information that may enable access to a given cell.

The channels or carriers described above and illustrated in FIG. 2 are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Self-Contained Slot

Figure 5:
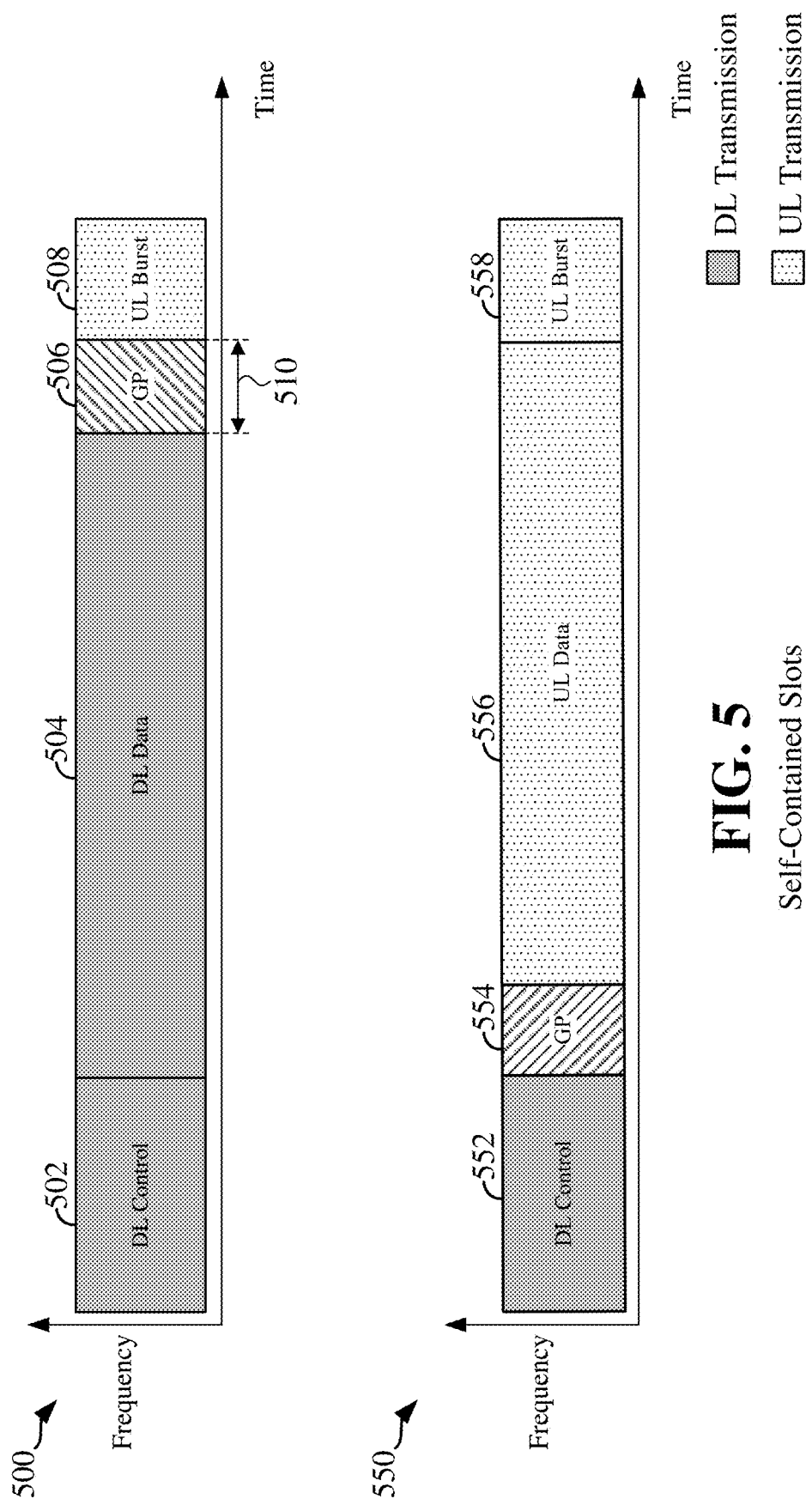
FIG. 5 illustrates self-contained slots in a time division duplex (TDD) carrier according to an aspect of the present disclosure.

As discussed above, wireless communications in the radio access network 100 may be organized in terms of slots. According to an aspect of the disclosure, one or more of these slots may be self-contained slots. For example, FIG. 5 illustrates two example structures of self-contained slots 500 and 550. Here, the slots 500 and 550 may correspond to the slot 402 described above and illustrated in FIG. 4.

In the illustrated example, a DL-centric slot 500 may be a transmitter-scheduled slot. The nomenclature DL-centric generally refers to a structure wherein more resources are allocated for transmissions in the DL direction (e.g., transmissions from the scheduling entity 202 to the scheduled entity 204). Similarly, an UL-centric slot 550 may be a receiver-scheduled slot, wherein more resources are allocated for transmissions in the UL direction (e.g., transmissions from the scheduled entity 204 to the scheduling entity 202).

Each slot, such as the self-contained slots 500 and 550, may include transmit (Tx) and receive (Rx) portions. For example, in the DL-centric slot 500, the scheduling entity 202 first has an opportunity to transmit control information, e.g., on a PDCCH, in a DL control region 502, and then an opportunity to transmit DL user data or traffic, e.g., on a PDSCH in a DL data region 504. Following a guard period (GP) region 506 having a suitable duration 510, the scheduling entity 202 has an opportunity to receive UL data and/or UL feedback including any UL scheduling requests, CSF, a HARQ ACK/NACK, etc., in an UL burst 508 from other entities using the carrier. Here, a slot such as the DL-centric slot 500 may be referred to as a self-contained slot when all of the data carried in the data region 504 is scheduled in the control region 502 of the same slot; and further, when all of the data carried in the data region 504 is acknowledged (or at least has an opportunity to be acknowledged) in the UL burst 508 of the same slot. In this way, each self-contained slot may be considered a self-contained entity, not necessarily requiring any other slot to complete a scheduling-transmission-acknowledgment cycle for any given packet.

The GP region 506 may be included to accommodate variability in UL and DL timing. For example, latencies due to radio frequency (RF) antenna direction switching (e.g., from DL to UL) and transmission path latencies may cause the scheduled entity 204 to transmit early on the UL to match DL timing. Such early transmission may interfere with symbols received from the scheduling entity 202. Accordingly, the GP region 506 may allow an amount of time after the DL data region 504 to prevent interference, where the GP region 506 provides an appropriate amount of time for the scheduling entity 202 to switch its RF antenna direction, an appropriate amount of time for the over-the-air (OTA) transmission, and an appropriate amount of time for ACK processing by the scheduled entity.

Similarly, the UL-centric slot 550 may be configured as a self-contained slot. The UL-centric slot 550 is substantially similar to the DL-centric slot 500, except the data region 556 is in the UL direction.

The slot structure illustrated in slots 500 and 550 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

PRB Bundling

One or more aspects of the present disclosure relate to the use of PRB bundling (or RB bundling). That is, when a scheduler 942 (see FIG. 9) schedules resources, it typically schedules a bundle or cluster of one or more RBs. As used in the present document, a 'cluster' refers to a set or group of RBs, which may or may not necessarily be contiguous with one another; while a 'bundle' refers to a set or group of RBs that are contiguous with one another. Thus, as used herein, while all PRB bundles are clusters of RBs, not all clusters of RBs are PRB bundles. The scheduler 942 may dynamically schedule the resources for a UE within these PRB bundles based on channel state feedback (CSF) provided by the UE. This CSF may indicate the quality or characteristics of the DL channel. For example, the CSF may include a channel quality indicator (CQI), a precoding matrix index (PMI) and a rank indicator (RI). The CQI may include, for example, a modulation and coding scheme (MCS) index that indicates the highest modulation and code rate at which the block error rate (BLER) of the channel being analyzed does not exceed 10%.

For example, the UE may measure the channel quality (e.g., signal to interference and noise ratio, or SINR) over the entire DL bandwidth. The UE may then provide a wideband CQI to the base station. In another example, the UE may measure the channel quality over only the PRB bundle(s) for which the UE has scheduled data, and provide respective CSF for each scheduled PRB bundle to the base station. In some examples, the CQI values for PRB bundles may be determined by combining the channel quality measurements (SINR) across layers (e.g., data streams in MIMO systems) and RBs to derive a total MCS index, which may then be normalized by the number of layers, with the resulting MCS index being fed back to the base station.

Some networks utilizing LTE technology have implemented PRB bundling. In these legacy networks, a set or bundle of PRBs (e.g., a precoding RB group, or PRG) is defined, where the RBs in the bundle are contiguous in the frequency dimension. In LTE networks, the pilot structure, or the pattern (e.g., in the frequency dimension) of REs that carry pilots or reference signals in each RB, is uniform across an entire PRG. Further, LTE networks apply the same precoding matrix to all RBs across the entire PRG. That is, LTE networks do not provide for frequency-selective precoding within a PRG, and the precoder remains the same across all subcarriers in the RBs within a PRG. Further, when the network sends a control signal indicating a precoding matrix indicator (PMI) corresponding to any RB in the PRG, then this PMI is considered a joint PMI, which applies to the entire PRG.

As discussed above, in the context of beamforming and MIMO technology, a multi-antenna device may apply precoding to one or more transmitted data streams, wherein a precoding matrix is applied to the streams. Application of the precoding matrix multiplies or combines the transmitted signals with suitable weighting and phase shifting before being transmitted from their respective antennas. By taking advantage of interference patterns, and in some examples, multipath interference, the radiation pattern may be manipulated to direct the beam for a single stream to a receiving device (in the case of beamforming), or to provide for spatial multiplexing to send multiple streams to a receiving device (in the case of MIMO).

In general, for precoding of different contiguous RBs, the precoding of the two subcarriers that are adjacent to one another, at adjacent edges of their respective RBs, are not necessarily the same. Accordingly, adjacent subcarriers in different, adjacent RBs, may have a large difference in their relative amplitude and/or phase. However, as discussed above, in the LTE network, the same precoding is applied to all RBs across a PRG.

PRB bundling in an LTE network can provide improved channel estimation by a receiving device such as a UE. That is, because the precoder is the same across the contiguous RBs within the PRG, the receiving device may perform channel estimation over a larger bandwidth, which typically leads to a better channel estimation quality. Furthermore, because of the lack of phase and/or amplitude discontinuities that might otherwise be caused by frequency-selective precoding, such wideband channel estimation can be implemented at relatively low cost and processing requirements at a UE.

However, these benefits from using PRB bundling in LTE networks come at the cost of an inability of the transmitter to perform fine-granularity precoding. That is, although the precoder is the same across the PRG, the best, or ideal precoder for one frequency subcarrier may be different than the best or ideal precoder for a different frequency subcarrier. If a very fine granularity of precoding matrix selection were available, e.g., selecting the best precoding matrix for each subcarrier, sizable beamforming gain may be achieved. Without having such a fine granularity for the selection of a suitable precoding matrix, the beamforming gain is reduced.

Continuous Precoding

In an aspect of the present disclosure, a compromise is provided, with some of the advantages of PRB bundling, but without requiring the same precoder across a wide bandwidth to enable wideband channel estimation. For example, unlike in an LTE network, where the same PMI is applied across an entire PRG, continuous-phase precoding, also referred to as continuous precoding or continuous beamforming, can provide for frequency-selective precoding. However, with continuous precoding, this frequency selectivity may be subject to certain limitations, to reduce abrupt phase changes and/or amplitude changes in the channel.

That is, with continuous precoding, the phase and/or amplitude applied to adjacent resource elements are substantially like one another (e.g., not discontinuous). As used in the present disclosure, the term continuous does not necessarily mean constant. Rather, continuous refers to a parameter that may vary from one resource element to the adjacent resource element by an amount no greater than a given threshold. That is, variation of the parameter by an amount greater than that threshold would be considered a discontinuity. In an aspect of the present disclosure, continuous precoding may refer to a frequency selective (e.g., per-subcarrier) precoding that ensures that the effective channel, after applying the precoders, does not experience abrupt phase and/or amplitude changes. That is, the phase and/or the amplitude applied to resource elements in adjacent subcarriers may be continuous. Furthermore, continuous precoding may refer to a time selective (e.g., per-symbol) precoding with similar characteristics. That is, the phase and/or amplitude applied to resource elements in adjacent symbols may be continuous. The term 'continuous precoding' in general may refer to continuous-phase and/or continuous-time precoding. Continuous precoding may accordingly apply precoding matrices, which themselves have limited phase and/or amplitude jumps. As one specific but non-limiting example, a precoder may be considered a continuous precoder if a difference in phase change applied to adjacent resource elements by the precoder is limited to values less than or equal to pi/12 radians. As a further example, a precoder may be considered a continuous precoder if a difference in an amplitude weight applied to adjacent resource elements by the precoder is limited to values less than or equal to 0.2 dB.

Much like the case for the constant precoding applied across a PRG in LTE, with continuous precoding, a UE may utilize a relatively low-cost wideband channel estimation to the scheduled, contiguous RBs in a cluster of RBs.

Some scheduled entities, such as UEs defined according to 3rd Generation Partnership Project (3GPP) standards, may support optional features that are signaled to the network (e.g., a base station) independent of each other. For example, a UE may have capabilities depending on its terminal capability class, category, and/or operational characteristics. For example, in Release 5 of the High Speed Packet Access (HSPA) standard, there are twelve terminal capability categories, which define the capability of a UE in a number of communication parameters.

Figure 6:
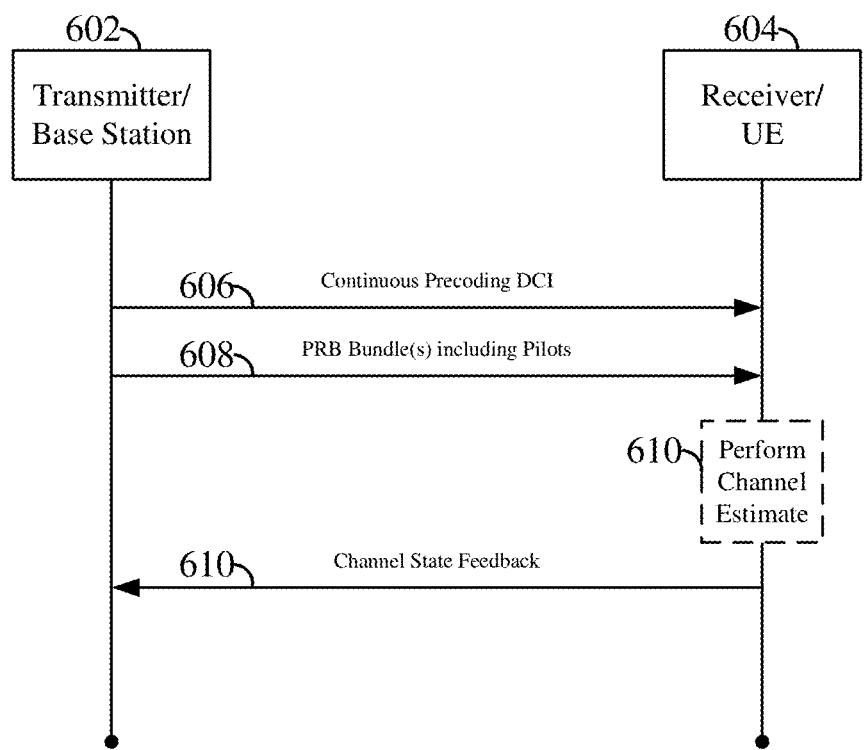
FIG. 6 is a call flow diagram illustrating an exemplary call flow utilizing continuous precoding according to some embodiments.

Referring now to FIG. 6, a call flow diagram is provided to show one exemplary call flow utilizing continuous precoding according to some aspects of the present disclosure. In the illustrated example, a transmitter 602 may correspond to a base station, a scheduling entity 202, a transmitter 302, or a portion of any of them; and a receiver 604 may correspond to a UE, a scheduled entity 204, a receiver 306, or a portion of any of them. Of course, as described above, while this diagram illustrates continuous precoding utilized on a DL transmission, those of ordinary skill in the art will comprehend that these concepts may be applied to a UL transmission as well. Further, in this diagram, time is represented in the vertical dimension, with the down direction representing forward movement in time (not to scale); and wherein signals transmitted from one node to another are represented by horizontal arrows between the lines below the respective nodes.

According to an aspect of the disclosure, the base station 602 may transmit suitable DL control information (DCI) 606 relating to continuous precoding. Concurrent to the DCI 606, or at any other time before or after transmission of the DCI 606, the base station 602 may further transmit one or more PRB bundles 608 including one or more pilots or reference signals. Here, in the case of DL data carried on a PRB bundle 608, for a given subcarrier, a given symbol, or any suitable block or set of REs 406, the same precoding is applied to the pilot and the data. Based on the pilots carried on the PRB bundle(s) 608, and configured based on the continuous precoding DCI 606, at block 610, the UE may estimate the DL channel and generate and transmit suitable channel state feedback (CSF) 612.

As described further below, continuous precoding DCI 606 may be configured to inform UEs or scheduled entities that continuous precoding is supported, and if it is supported, whether continuous precoding will be applied for an RB cluster. Further, when continuous precoding is applied, the continuous precoding DCI 606 may inform the UE about one or more parameters relating to the continuous precoding.

In some examples, the continuous precoding DCI 606 transmitted by a base station 602 may include explicit signaling to inform a UE 604 that the base station supports continuous precoding. Because a base station's support for continuous precoding may not change over short periods of time, such explicit signaling may be provided via semi-static signaling, e.g., utilizing Layer 3 signaling such as radio resource control (RRC). In another example, such explicit signaling may be broadcasted over the cell, e.g., on SIBs or a PBCH. However, within the scope of the present disclosure, explicit signaling indicating base station support for continuous precoding may be provided utilizing dynamic signaling, such as via DCI on a PDCCH, or any other suitable signaling mechanism known to those of ordinary skill in the art.

In some examples, the base station 602 may determine to apply continuous precoding to an RB cluster based on any suitable factors or parameters. Optionally, a UE 604 may transmit a request to the base station 602 to enable or apply continuous precoding. For example, a UE 604 may have limited overhead availability for CSF transmissions. In this case, if continuous precoding were supported and applied to resources corresponding to the UE 604, the UE 604 may be enabled to perform wideband channel estimation, rather than several narrowband channel estimates. In this way, a smaller CSF granularity, and a corresponding smaller amount of CSF, may be transmitted by the UE.

In a further aspect, the continuous precoding DCI 606 may include an instruction whether continuous precoding is applied for an RB cluster. For example, the base station 602 may transmit explicit signaling to inform a UE 604 of the identity of the specific RBs in which continuous precoding is applied. Such signaling to identify those RBs may be dynamic, per-slot DCI, e.g., utilizing the PDCCH; or in other examples, utilizing semi-static signaling, such as RRC signaling.

However, in another aspect of the disclosure, the base station 602 may forgo such explicit signaling to identify the particular RBs in which the scheduler applies continuous precoding. That is, the scheduler 942 (see FIG. 9) may implicitly indicate continuous adjustments of the precoding matrix from one subcarrier to the next based on another parameter. For example, when scheduling resources, in order to implicitly signal to a UE 604 that scheduled resources have continuous precoding applied, the scheduler may select a set of resources that includes a PRB bundle, i.e., a contiguous cluster of RBs that, when taken together, span a bandwidth greater than a minimum threshold bandwidth. That is, the transmission property that may be adjusted, and utilized to signal which RBs have continuous precoding applied, is the property that those resources will correspond to a contiguous cluster of RBs that has greater than a minimum threshold bandwidth.

For example, when allocating resources, without explicitly notifying the UE 604, and based on CSF provided from the UE 604, the scheduler 942 may select suitable precoding matrices to ensure the phase and/or amplitude continuity. Thus, when the scheduler 942 wishes to provide for continuous precoding for a contiguous cluster of RBs, the precoding matrices applied to the resources within that cluster may be selected such that the phase and/or amplitude is continuous, as defined above.

Figure 7:
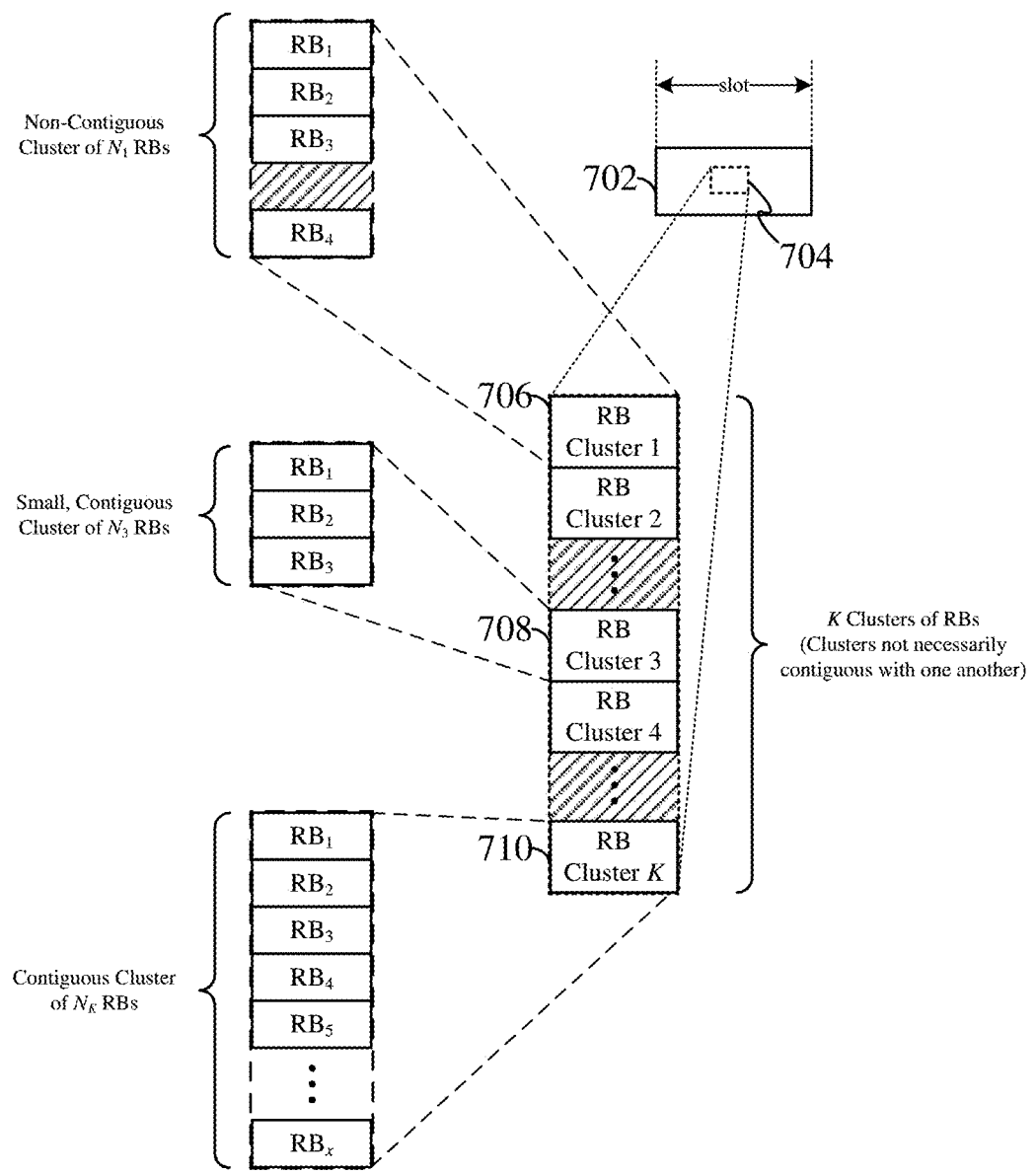
FIG. 7 is a schematic illustration of a set of resource blocks, showing an algorithm for implicitly determining whether continuous precoding is applied to an RB cluster according to some embodiments.

FIG. 7 is a schematic illustration expanding a portion of a slot 702 to illustrate an algorithm for determining whether continuous precoding is applied to an RB cluster based on such an implicit indication, as described above. Here, the slot 702 may be the same as, or similar to slots 402, 500, or 550, described above. As illustrated, a portion 704 of the slot 702 is expanded, showing that it includes a number (K) of clusters of RBs. The portion 704 may correspond to a resource assignment for a UE, such as the UE 604. In the illustrated example, some clusters in the resource allocation 704 are contiguous to one another, while some clusters are non-contiguous.

In an aspect of the present disclosure, a predetermined rule known to both the UE 604 and the base station 602 may provide for such implicit signaling to indicate whether continuous precoding is applied to an RB cluster. For example, for a contiguous allocation of RBs that span a bandwidth greater than a minimum threshold, the scheduler 942 may select precoding matrices that have a continuous phase. Here, the minimum threshold bandwidth $N_{min}$ may correspond to a minimum number of contiguous RBs in a given RB cluster. With this algorithm, for a contiguous set of RBs that spans at least a minimum threshold bandwidth, a receiving UE may assume continuous precoding of the transmissions in that set of RBs.

For example, as illustrated, a scheduler 942 may schedule a resource allocation 704 for a given UE that includes K clusters of RBs, where K≥1. Here, each $k^{th}$ cluster of RBs consists of $N_k$ RBs, where k is an index of the clusters of RBs, and k=1, 2, ..., K. According to an aspect of the present disclosure, if the scheduler 942 configures an RB cluster such that $N_k \geq N_{min}$ for the RB cluster of index k, then the UE may assume that continuous precoding is applied to the resources of the RB cluster of index k. Thus, the bandwidth of an RB cluster may be utilized as an implicit indication to a UE about whether continuous precoding is applied to the resources of that RB cluster.

Referring to FIG. 7, the RB cluster 706 where k=1 is expanded to show that this cluster includes four RBs, where $RB_4$ is not contiguous to the other RBs in the cluster. In an aspect of the present disclosure, since the RBs are not contiguous within the RB cluster, the base station may not apply continuous precoding, and the UE may assume that continuous precoding is not applied to the RB cluster 706 where k=1.

The RB cluster 708 where k=3 is expanded to show that this cluster includes three RBs, which are all contiguous to one another. For the sake of description, it may be assumed that, in this case, $N_{min}>3$. In an aspect of the present disclosure, because $N_k<N_{min}$, the base station may not apply continuous precoding, and the UE may assume that continuous precoding is not applied to the RB cluster 708 where k=3.

The RB cluster 710 where k=K is expanded to show that this cluster includes x RBs, which are all contiguous to one another. For the sake of description, it may be assumed that $N_{min} \leq x$. In an aspect of the present disclosure, because $N_k \geq N_{min}$, the base station may apply continuous precoding, and the UE may assume that continuous precoding is applied to the RB cluster 710 where k=K.

In a further aspect of the disclosure, the value of $N_{min}$ may be set to any suitable value. Further, in some examples, there may be multiple values of $N_{min}$, each one being utilized for a different transmission scheme. For example, $N_{min}$ may take one value in an open loop transmission scheme, but another, different value in a closed loop transmission scheme.

In some examples, the minimum threshold bandwidth $N_{min}$ may be broadcast to the UE via a SIB, via semi-static signaling, via RNC signaling, and/or dynamically signaled to the UE utilizing, e.g., the PDCCH.

In some examples, the minimum threshold bandwidth $N_{min}$ may depend on one or more transmission parameters, including but not limited to the subcarrier spacing (SCS), the number of antennas at the scheduling entity, the system bandwidth, a RBG (resource block granularity) etc. For example, if the SCS is wider, then the value of $N_{min}$ may be smaller, to correspond to the same bandwidth. Further, if the system bandwidth is small, then the value of $N_{min}$ may be smaller, as there may be fewer RBs within the system bandwidth. Further, the base station may trigger continuous precoding for an RB cluster if the RBG is wider than an RBG threshold. Here, an RBG corresponds to a number of RBs (e.g., a cluster or bundle or RBs), wherein a scheduler may only schedule resources based on an RBG rather than per RB. In this case, for example, if an RBG is wide, continuous precoding may be applied based on a number of RBGs, rather than a minimum threshold number of RBs. Of course, as above, continuous precoding may be applied only if a given RBG corresponds to a contiguous set of RBs. In further examples, the minimum threshold bandwidth $N_{min}$ may depend on a UE capability or category for a given UE or scheduled entity. That is, such a minimum threshold bandwidth may be UE-specific, and based on information about the receiving device such as its receiver bandwidth capability or type, its processing capabilities, etc. Still further, the minimum threshold bandwidth $N_{min}$ may be based on a UE request or recommendation. In any of the above examples, the minimum threshold bandwidth and/or the parameter or parameters to utilize to determine the minimum threshold bandwidth, may be configurable, and signaled from a transmitting device to a receiving device utilizing any suitable signaling mechanism, including but not limited to DCI, RRC signaling, a MAC control element, etc.

In a further aspect of the disclosure, the continuous precoding DCI 606 may be configured to include one or more parameters relating to continuous precoding. As described further below, these parameters may include, for example, available transport block sizes (TBS), the granularity of channel state feedback (CSF), and a frequency-domain pilot density.

When utilizing a self-contained slot as described above (see, e.g., FIG. 5), scheduling information (e.g., a grant) and control information for REs within a data region in a given slot may be received in that same slot. Further, the UE must decode and process the data before transmitting HARQ feedback in the UL burst. In this case, only a limited amount of time may be available for the receiving UE to decode and process this control information. Therefore, the processing capabilities of a UE may be pushed to their limit. In particular, a low-performing UE may not always have sufficient time to perform channel estimation, and to implement demapping and decoding of received code blocks.

Accordingly, to help ensure that UEs can support self-contained slots, the maximum transport block size (TBS) (i.e., the maximum number of code blocks (CBs) inside a slot) may be limited. This limit is not because there are not enough physical resources to support a larger number of CBs in a slot, but rather, because the UE may not otherwise have time to decode the CBs within such a self-contained slot before having to transmit an ACK/NACK.

However, when utilizing continuous precoding, as described above, a UE may perform a single, wideband channel estimation, rather than needing to perform multiple narrow-band channel estimations for the same bandwidth. Accordingly, the time required for the UE to estimate the channel may be reduced relative to that for narrowband channel estimation. With this reduced channel estimation time, a UE may have additional time available for decoding CBs relative to the amount of time it would otherwise have when the UE utilized narrowband channel estimation. Therefore, the scheduler may send a greater number of CBs: i.e., a larger TBS. Therefore, according to an aspect of the present disclosure, a larger TBS limit may be utilized for transmissions over an RB cluster when continuous precoding is applied to those RBs, and a smaller TBS limit may be utilized for transmissions over an RB cluster when continuous precoding is not applied to those RBs.

In some examples, the different TBSs, or maximum TBS limits, may be agreed and specified in a standard. For example, UEs may be standardized into different categories, where one category may be capable of wideband channel estimation, while another category may not.

As discussed above, a UE may transmit various UL channel state information, or channel state feedback (CSF) 610 to the base station. This CSF may include, for example, a precoding matrix indicator (PMI), a rank indicator (RI), and/or a channel quality indicator (CQI). Each transmission of such CSF may correspond to a portion of the channel having a wide bandwidth, or a narrow bandwidth, depending on the particular implementation. CSF granularity refers to the capability of a UE to provide CSF relating to smaller bandwidths.

According to an aspect of the present disclosure, different CSF granularity may be used for feedback corresponding to an RB cluster when continuous precoding is applied to those RBs, and when continuous precoding is not applied to those RBs. For example, a UE may be configured for a default CSF granularity, wherein the UE reports PMI, RI, and CQI for each RB. However, when continuous precoding is applied to an RB cluster, then the UE may report such CSF for those RBs with a larger granularity, e.g., once for each contiguous resource allocation. For example, CSF (e.g., joint CSF) may be reported for each contiguous cluster of $N_k$ RBs, to which continuous precoding is applied. In this example, the UE need not necessarily send an explicit notification to the base station about the change in its CSF granularity, as such a change may be implicitly indicated, or implied, based on a predetermined rule relating to the minimum contiguous cluster size, as described above.

In another example, a UE may report CSF (e.g., PMI, RI, and/or CQI) once for each contiguous allocation. As one illustrative example, a UE may receive DL data on two contiguous sets of RBs, including a first cluster having RB indices 1-20, and a second cluster having RB indices 30-35. In this example, either based on an explicit indication from the base station, or an implicit indication (e.g., wherein the bandwidth of each contiguous RB cluster is greater than $N_{min}$), the UE may determine that continuous precoding is applied to the RBs in each of these clusters. In this case, the UE may report CSF once for each of the two clusters, rather than reporting separate PMI/RI/CQI for each RB.

This may similarly apply to a scenario where the UE not only transmits CSF including PMI/RI/CQI, but additionally, where the UE reports explicit CSF. Explicit CSF may include feedback relating to a channel covariance matrix, the main beam directions in each contiguous allocation, and/or noise directions inside each contiguous allocation.

Figure 8:
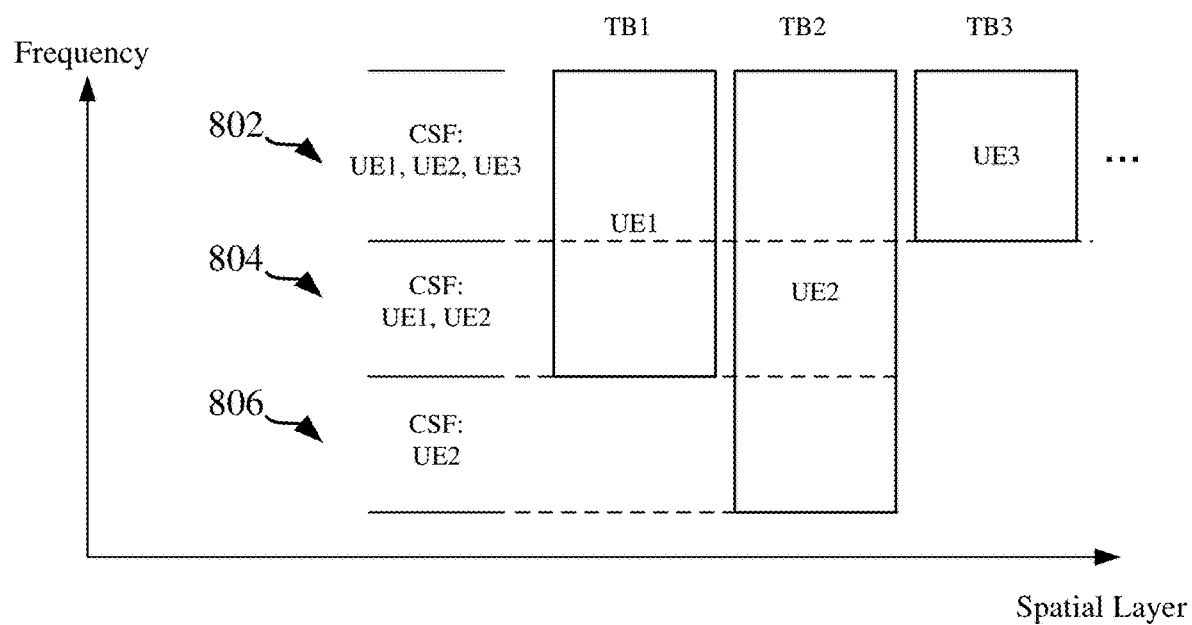
FIG. 8 is a schematic illustration of a set of transport blocks in a multi-user multiple input multiple output (MU-MIMO) environment according to some embodiments.

FIG. 8 is a schematic illustration of three transport blocks (TBs) in a three-layer MU-MIMO setting according to one example. In FIG. 8, the vertical direction represents frequency, while the horizontal dimension represents a spatial differentiation between different TBs precoded for different UEs. That is, in MU-MIMO, the base station may transmit two or more different spatial layers in the same frequency. In this illustration, three TBs directed to three UEs (UE1, UE2, and UE3) are illustrated, although any number of TB s may be transmitted to any number of UEs in a given implementation. As seen in this illustration, at some frequencies, resources are allocated to all three UEs: UE1, UE2, and UE3. At other frequencies, resources are allocated only to two UEs: UE1 and UE2. And at still other frequencies, resources are only allocated to one UE: UE2.

As discussed above, UE reporting of CSF may be based on a CSF granularity corresponding to a cluster of RBs, or a granularity corresponding to contiguous allocations of RBs. In another aspect of the disclosure, in a MU-MIMO setting such as the one illustrated in FIG. 8, a given UE may potentially report its CSF per contiguous allocation for which the UE pairing does not change. For example, with reference to UE1, this UE may report a first CSF 802 for the set of subcarriers where UE1, UE2, and UE3 are paired; and a second CSF 804 for the set of subcarriers where only UE1 and UE2 are paired. Of course, UE1 may in some examples report a third CSF 806 for the set of subcarriers where only UE2 has scheduled resources, and/or for any other portions of the spectrum outside of a resource allocation for that UE.

To provide for a UE to segment the spectrum based on the UE pairing in MU-MIMO, in some examples a base station may transmit an explicit signal to the UE that identifies the boundaries of the allocations of the UEs. For example, the continuous precoding DCI 606 (see FIG. 6) may include this signaling to identify boundaries of UE allocations. In some examples, the boundaries may correspond to upper and lower subcarrier boundaries for each UE being spatially multiplexed; while in other examples, the boundaries may correspond to boundaries where UE pairing changes.

When continuous precoding is utilized, the phase and/or amplitude is substantially continuous across a channel, and accordingly, the channel may have a smaller delay spread. Therefore, a UE may be capable of generating a suitable estimate of the effective channel based on fewer DL pilots (e.g., reference signals including but not limited to a DMRS and/or CRS). Accordingly, when continuous precoding is applied to an RB cluster, the base station may reduce the frequency-domain density of such DL pilot signals carried on those RBs.

That is, according to an aspect of the present disclosure, the base station may select a frequency domain pilot density to apply within an RB cluster, based on whether or not continuous precoding is being applied to those RBs. As one example, a base station may select the density of DMRSs in a given cluster of one or more RBs based on whether continuous precoding is being applied to that cluster.

Furthermore, the UE may be preconfigured to perform channel estimation for an RB cluster, based on a first predetermined pilot density when continuous precoding is applied to those RBs, and to perform channel estimation for an RB cluster, based on a second, different predetermined pilot density when continuous precoding is not applied to those RBs, or not supported. For example, if the unprecoded channel, or the RB-based precoded channel needs a pilot every X subcarriers, then if continuous precoding is applied to an RB cluster, a subsampled by two could be supported for those RBs. That is, the UE may generate a wideband channel estimate based on a lower frequency domain pilot density every 2X subcarriers.

Scheduling Entity

Figure 9:
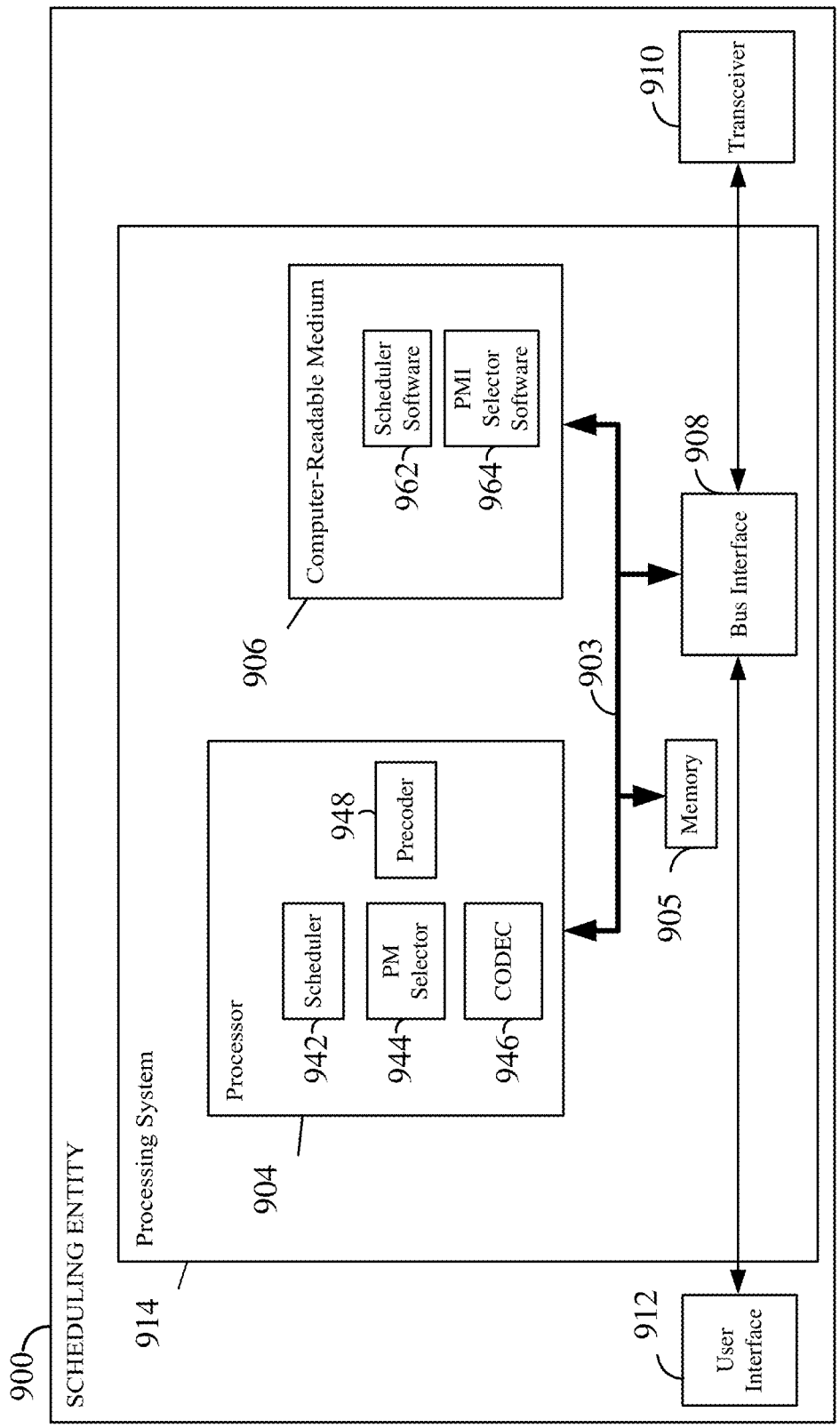
FIG. 9 is a block diagram illustrating an example of a hardware implementation for a scheduling entity employing a processing system according to some embodiments.

FIG. 9 is a simplified block diagram illustrating an example of a hardware implementation for a scheduling entity 900 employing a processing system 914. For example, the scheduling entity 900 may be a user equipment (UE) as illustrated in FIG. 1. In another example, the scheduling entity 900 may be a base station as illustrated in FIG. 1, the scheduling entity 202 illustrated in FIG. 2, the transmitter 302 and/or receiver 306 illustrated in FIG. 3, and/or the transmitter/base station 602 illustrated in FIG. 6.

The scheduling entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be used to implement any one or more of the processes described below and illustrated in FIGS. 11 and/or 12.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable storage medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

In some aspects of the disclosure, the processor 904 may include scheduler circuitry 942 configured for various functions, including, for example, scheduling, assigning, reconfiguring, and releasing resources for one or more scheduled entities. The scheduler circuitry 942 may, for example, schedule a bundle or cluster of one or more RBs, which may or may not necessarily be contiguous with one another. Further, the scheduler circuitry 942 may implicitly signal that scheduled resources have continuous precoding applied by selecting a set of resources that includes a contiguous cluster of RBs that, when taken together, spans a bandwidth greater than a minimum threshold bandwidth. For example, the scheduler circuitry 942 may be configured to implement one or more of the functions described below in relation to FIG. 11, including, e.g., blocks 1106 and/or 1108. Further, the scheduler circuitry 942 may be configured to implement one or more of the functions described below in relation to FIG. 12, including, e.g., blocks 1202 and/or 1206.

The processor 904 may further include precoding matrix (PM) selector circuitry 944 configured for various functions, including, for example, selecting a suitable precoding matrix to apply for precoding a given scheduled resource. In some examples, the PM selector circuitry 944 may select precoding matrices that have limited phase and/or amplitude jumps, such that continuous precoding may be applied to scheduled resources. For example, the PM selector circuitry 944 may be configured to implement one or more of the functions described below in relation to FIG. 11, including, e.g., blocks 1102, 1104, 1110 and/or 1112. Further, the PM selector circuitry 944 may be configured to implement one or more of the functions described below in relation to FIG. 12, including, e.g., blocks 1202 and/or 1210.

The processor 904 may further include coder/decoder (CODEC) circuitry 946 configured for various functions, including, for example, channel coding for DL transmissions, including the generation of a set of code blocks (CBs), as well as decoding UL transmissions. For example, the CODEC circuitry 946 may be configured to implement one or more of the functions described below in relation to FIG. 11, including, e.g., blocks 1106 and/or 1108. Further, the CODEC circuitry 946 may be configured to implement one or more of the functions described below in relation to FIG. 12, including, e.g., blocks 1206, 1208, and/or 1210.

The processor 904 may further include precoder circuitry 948 configured for various functions, including, for example, precoding DL transmissions based, for example, on the precoding matrix (PM) selected by the PM selector circuitry 944. Precoder circuitry 948 may be configured for applying precoding to one or more RBs, e.g., across an RB bundle in a DL transmission utilizing one or more precoding matrices. In some examples, the precoder circuitry 948 may be configured to apply continuous precoding across an RB bundle. For example, the precoder circuitry 948 may be configured to implement one or more of the functions described below in relation to FIG. 11, including, e.g., blocks 1110, 1112, 1114, and/or 1116. Further, the precoder circuitry 948 may be configured to implement one or more of the functions described below in relation to FIG. 12, including, e.g., blocks 1206, 1208, and/or 1210.

The processor 904 is responsible for managing the bus 902 and general processing, including the execution of software stored on the computer-readable storage medium 906. The software, when executed by the processor 904, causes the processing system 914 to perform the various functions described below for any particular apparatus. The computer-readable storage medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 906. The computer-readable storage medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 906 may reside in the processing system 914, external to the processing system 914, or distributed across multiple entities including the processing system 914. The computer-readable storage medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may include scheduler software 962 configured for various functions, including, for example, scheduling, assigning, reconfiguring, and releasing resources for one or more scheduled entities. The scheduler software 962 may, for example, schedule a bundle or cluster of one or more RBs, which may or may not necessarily be contiguous with one another. Further, the scheduler software 962 may implicitly signal that scheduled resources have continuous precoding applied by selecting a set of resources that includes a contiguous cluster of RBs that, when taken together, spans a bandwidth greater than a minimum threshold bandwidth. For example, the scheduler software 962 may be configured to implement one or more of the functions described below in relation to FIG. 11, including, e.g., blocks 1106 and/or 1108. Further, the scheduler software 962 may be configured to implement one or more of the functions described below in relation to FIG. 12, including, e.g., blocks 1202 and/or 1206.

The computer-readable storage medium 906 may further include precoding matrix (PM) selector software 964 configured for various functions, including, for example, selecting a suitable precoding matrix to apply for precoding a given scheduled resource. In some examples, the PM selector software 964 may select precoding matrices that have limited phase and/or amplitude jumps, such that continuous precoding may be applied to scheduled resources. For example, the PM selector software 964 may be configured to implement one or more of the functions described below in relation to FIG. 11, including, e.g., blocks 1102, 1104, 1110 and/or 1112. Further, the PM selector circuitry 944 may be configured to implement one or more of the functions described below in relation to FIG. 12, including, e.g., blocks 1202 and/or 1210.

In various configuration, the scheduling entity 900 may include means for allocating a set of resources as scheduled resources for wireless communication; means for configuring one or more transmission parameters for the scheduled resources; means for determining whether to apply continuous precoding; and/or means for determining a minimum threshold bandwidth. In one example, the aforementioned means may be the processor(s) 904 configured to perform the functions recited by the aforementioned means. In another example, the aforementioned means may be the scheduler 942, the PM selector 944, and/or the precoder 948. In another aspect, the aforementioned means may be a circuit or any apparatus configured to perform the functions recited by the aforementioned means.

Figure 11:
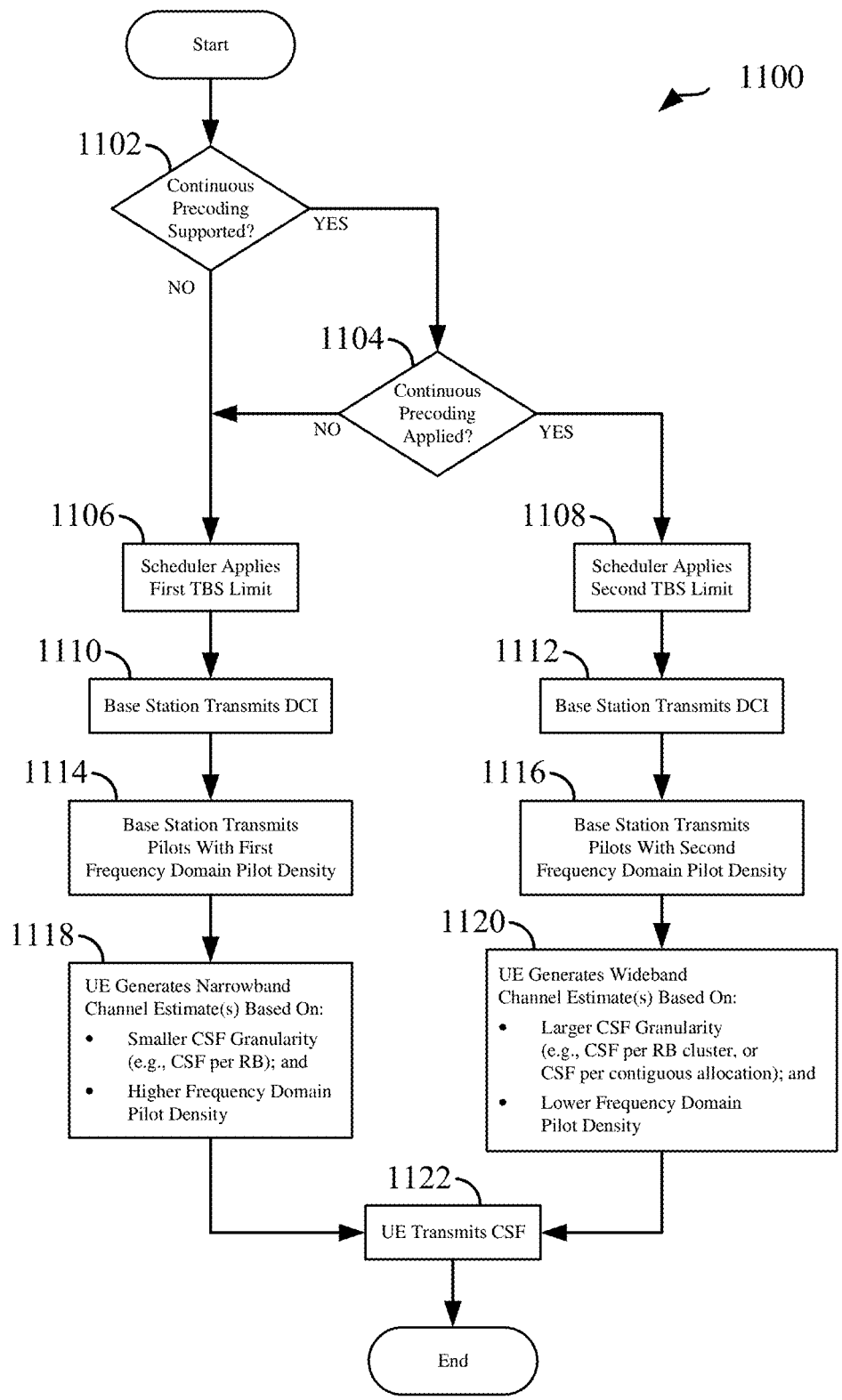
FIG. 11 is a flow chart illustrating an exemplary process for the dynamic adjustment of transmission properties with continuous precoding according to some embodiments.
Figure 12:
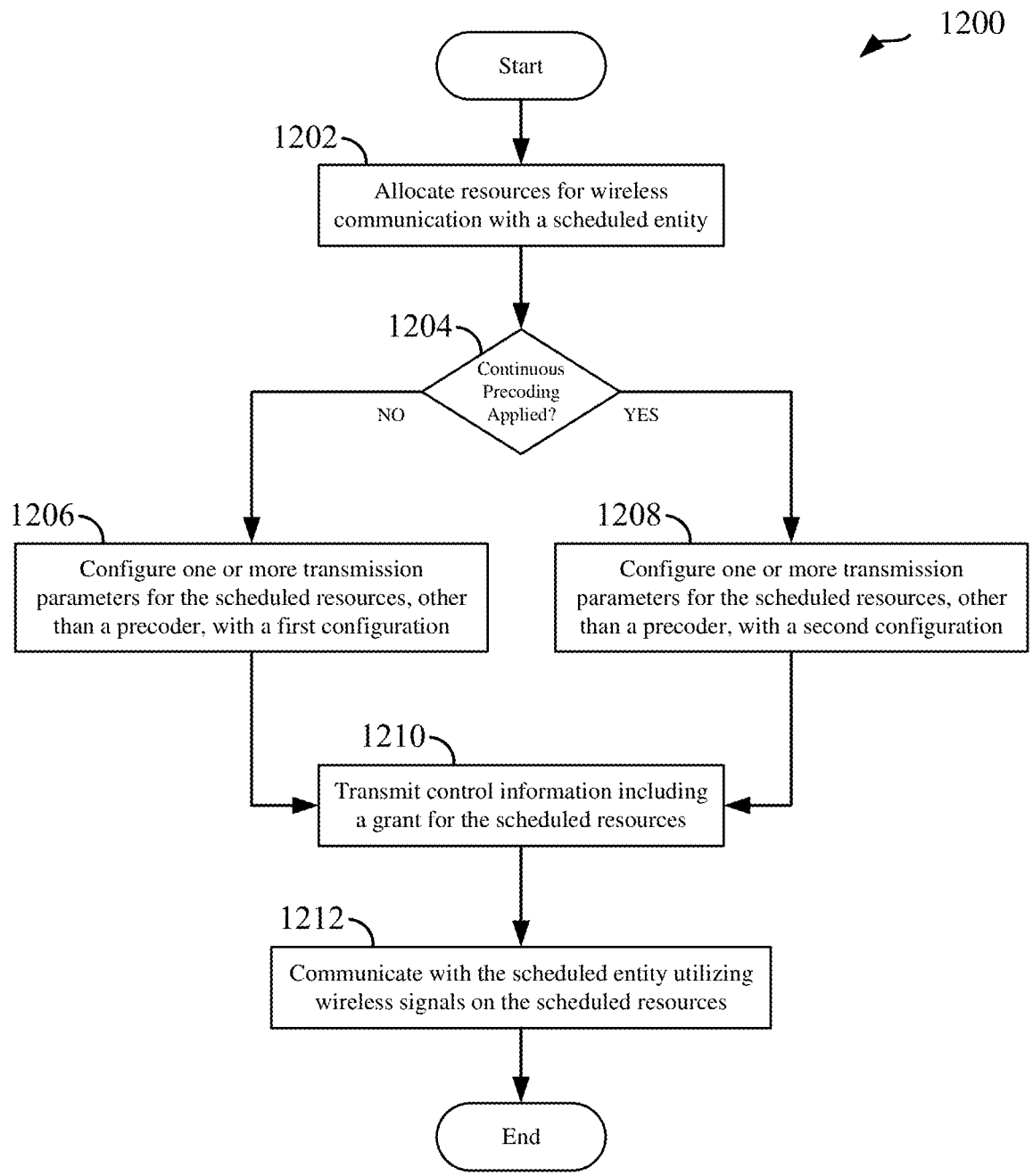
FIG. 12 is a flow chart illustrating an exemplary process for the dynamic adjustment of transmission properties with continuous precoding, operable at a scheduling entity, according to some embodiments.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 3, 6, 9, and/or 10, and utilizing, for example, the processes and/or algorithms described herein in relation to FIGS. 11, 12, and/or 13.

Scheduled Entity

Figure 10:
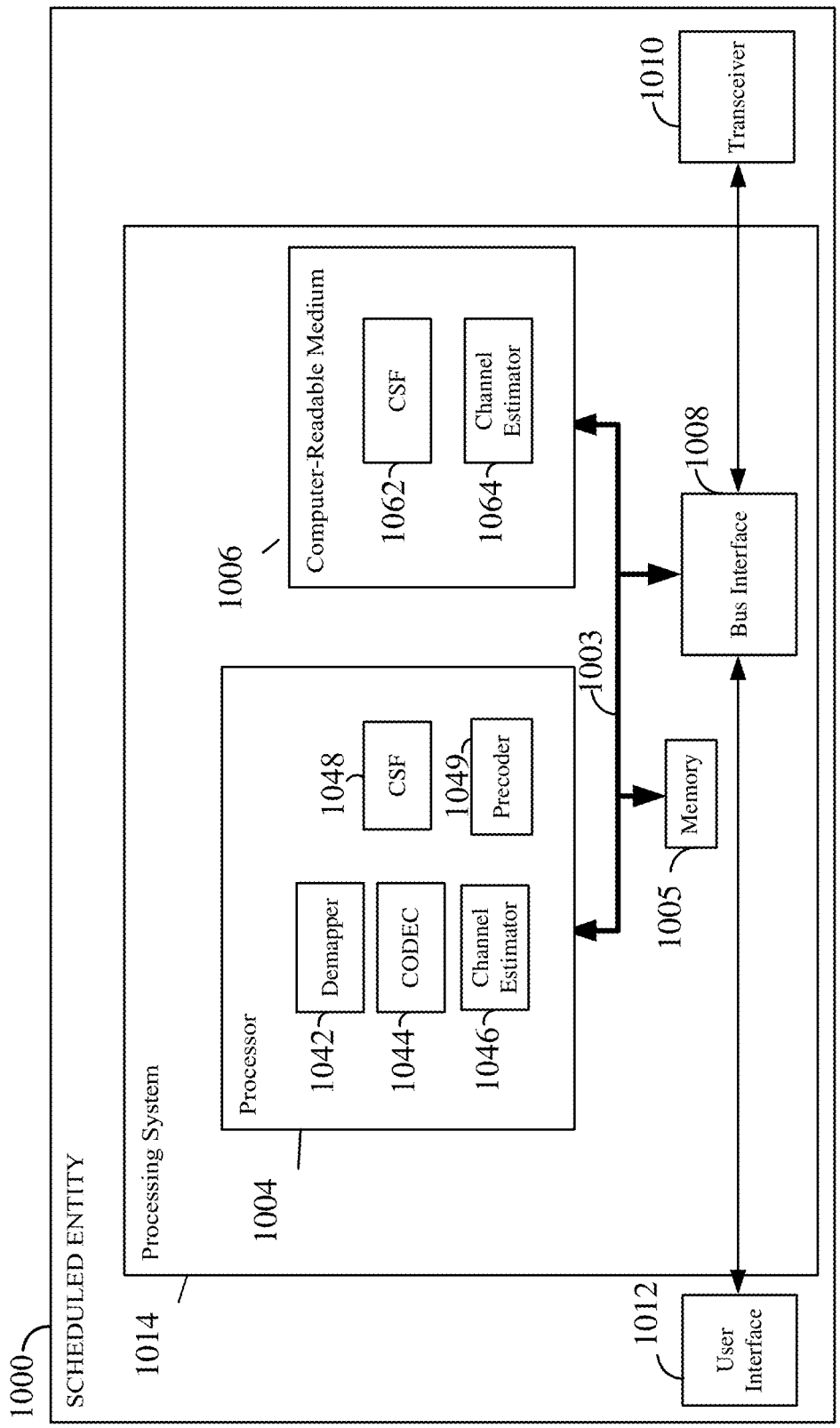
FIG. 10 is a block diagram illustrating an example of a hardware implementation for a scheduled entity employing a processing system according to some embodiments.

FIG. 10 is a conceptual diagram illustrating an example of a hardware implementation for an exemplary scheduled entity 1000 employing a processing system 1014. In accordance with various aspects of the disclosure, an element, or any portion of an element, or any combination of elements may be implemented with a processing system 1014 that includes one or more processors 1004. For example, the scheduled entity 1000 may be a user equipment (UE) as illustrated in FIG. 1, the scheduled entity 204 illustrated in FIG. 2, the transmitter 302 and/or receiver 306 illustrated in FIG. 3, and/or the receiver/UE 604 illustrated in FIG. 6.

The processing system 1014 may be substantially the same as the processing system 714 illustrated in FIG. 7, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in relation to FIG. 9. That is, the processor 1004, as utilized in a scheduled entity 1000, may be used to implement any one or more of the processes described below and illustrated in FIGS. 11 and/or 13.

In some aspects of the disclosure, the processor 1004 may include demapper circuitry 1042 configured for various functions, including, for example, demapping of received code blocks. For example, the demapper circuitry 1042 may be configured to implement one or more of the functions described below in relation to FIG. 11, including, e.g., blocks 1118 and/or 1120. Further, the demapper circuitry 1042 may be configured to implement one or more of the functions described below in relation to FIG. 13, including, e.g., block 1302.

The processor 1004 may further include CODEC circuitry 1044 configured for various functions, including, for example, channel coding for UL transmissions, including the generation of a set of code blocks (CBs), as well as decoding DL transmissions. For example, the CODEC circuitry 1044 may be configured to implement one or more of the functions described below in relation to FIG. 11, including, e.g., blocks 1118 and/or 1120. Further, the demapper circuitry 1042 may be configured to implement one or more of the functions described below in relation to FIG. 13, including, e.g., block 1302.

The processor 1004 may further include channel estimator circuitry 1046 configured for various functions, including, for example, wideband channel estimation and/or narrowband channel estimation based, e.g., on pilots carried on DL transmissions. The channel estimate may be utilized to generate one or more categories of CSF at any suitable CSF granularity. For example, the channel estimator circuitry 1046 may be configured to implement one or more of the functions described below in relation to FIG. 11, including, e.g., blocks 1118, 1120, and/or 1122. Further, the demapper circuitry 1042 may be configured to implement one or more of the functions described below in relation to FIG. 13, including, e.g., blocks 1306, 1308, and/or 1310.

The processor 1004 may further include channel state feedback (CSF) circuitry 1048 configured for various functions, including, for example, the generation of CSF based on a channel estimate, which may be provided by the channel estimator circuitry 1046, described above. This CSF may indicate the quality or characteristics of the DL channel. For example, the CSF may include a channel quality indicator (CQI), a precoding matrix index (PMI) and a rank indicator (RI). The CQI may include, for example, a modulation and coding scheme (MCS) index wideband channel estimation and/or narrowband channel estimation based, e.g., on pilots carried on DL transmissions. The channel estimate may be utilized to generate one or more categories of CSF at any suitable CSF granularity. That is, each transmission of CSF may correspond to a portion of the channel having a wide bandwidth, a narrow bandwidth, or any suitable portion of the system bandwidth. For example, the CSF circuitry 1048 may be configured to implement one or more of the functions described below in relation to FIG. 11, including, e.g., block 1118, 1120, and/or 1122. Further, the CSF circuitry 1048 may be configured to implement one or more of the functions described below in relation to FIG. 13, including, e.g., blocks 1306, 1308, and/or 1310.

The processor 1004 may further include precoder circuitry 1049 configured for various functions, including, for example, precoding UL transmissions based, for example, on a selected precoding matrix (PM). Precoder circuitry 1049 may be configured for applying precoding to one or more RBs, e.g., across an RB bundle in a UL transmission, utilizing one or more precoding matrices. In some examples, the precoder circuitry 1049 may be configured to apply continuous precoding across an RB bundle. For example, the precoder circuitry 1049 may be configured to implement one or more of the functions described below in relation to FIG. 11, including, e.g., block 1122. Further, the precoder circuitry 1049 may be configured to implement one or more of the functions described below in relation to FIG. 13, including, e.g., block 1310.

In various configuration, the scheduled entity 1000 may include means for communicating with a scheduling entity, means for generating a channel estimate, means for transmitting channel state feedback, means for receiving downlink control information, means for determining whether continuous precoding is applied to scheduled resources, and/or means for generating channel state information. In one example, the aforementioned means may be the processor(s) 1004 configured to perform the functions recited by the aforementioned means. In another example, the aforementioned means may be the demapper 1042, the CODEC 1044, the channel estimator 1046, the CSF circuitry 1048, and/or the precoder 1049. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, 3, 6, 9, and/or 10, and utilizing, for example, the processes and/or algorithms described herein in relation to FIGS. 11, 12, and/or 13.

Flow Charts

FIG. 11 is a flow chart illustrating an exemplary process 1100 for the dynamic adjustment of transmission properties with continuous precoding in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 202, the transmitter 302, the base station 602, and/or the scheduling entity 900 described above and illustrated in FIGS. 2, 3, 6, and 9. In some examples, the process 1100 may be carried out by the scheduled entity 204, the receiver 306, the UE 604, and/or the scheduled entity 1000 described above and illustrated in FIGS. 2, 3, 6, and 10. In some examples, the process 1100 may be carried out by any suitable apparatus or means for carrying out the functions or algorithm described below. As discussed above, it is to be understood that aspects of the present disclosure, including process 1100, may apply to uplink, downlink, and sidelink transmissions. However, for ease of description, an exemplary process corresponding to a downlink transmission is described herein below.

At block 1102, a scheduling entity 900 may determine whether a continuous precoding feature is supported. Support for a continuous precoding feature may be based on a variety of factors, including but not limited to capabilities of the scheduling entity 900, capabilities of one or more scheduled entities 1000, etc. If the continuous precoding feature is supported, then the process may proceed to block 1104. At block 1104, the scheduling entity 900 may determine whether to apply continuous precoding to a cluster of one or more RBs. Here, again, the decision whether to apply continuous precoding to an RB cluster may be based on a variety of factors, including but not limited to CSF received from one or more scheduled entities 1000; a capability or classification of a scheduled entity 1000; a request from one or more scheduled entities 1000 to apply continuous precoding; cell capacity; or any other suitable factors. For example, a transmitter may apply continuous precoding to a set of RBs in one band where the transmitter has good knowledge of the channel conditions; while the transmitter may apply constant precoding, or other precoding with a suitable RB granularity, to a set of RBs in another band where the transmitter does not have good knowledge of the channel conditions. In another example, as described above and illustrated in FIG. 8, a transmitting base station or scheduling entity may determine whether to apply continuous precoding to a given RB cluster based on whether a receiving UE is paired with another UE using MU-MIMO.

As described above, in some aspects of the disclosure, the scheduling entity 200 may dynamically control one or more transmission parameters for an RB cluster based on whether or not continuous precoding is applied to those RBs. Thus, as seen in FIG. 11, parallel paths show actions or processes taken by a scheduling entity 900 or a scheduled entity 1000 conditional upon whether or not continuous precoding is being applied.

For example, if continuous precoding is not applied to an RB cluster, then at block 1106, a scheduler at the scheduling entity 900 may schedule a cluster of one or more RBs for the scheduled entity 1000 utilizing a first TBS limit. However, if continuous precoding is applied to the resource, then at block 1108, the scheduler at the scheduling entity 900 may schedule a cluster of one or more RBs for the scheduled entity 1000 utilizing a second TBS limit, different from the first TBS limit. In one example, the second TBS limit, used with continuous precoding, may be larger than the first TBS limit, used without continuous precoding.

Further, if continuous precoding is not applied to an RB cluster, then at block 1110, the scheduling entity 900 may transmit control information (e.g., DCI) to the scheduled entity 1000. The control information may include scheduling information such as a grant or a resource allocation for a resource including a cluster of one or more RBs, and in some examples, may optionally include an explicit indication to the scheduled entity 1000 that continuous precoding will not be applied to an RB cluster. Further, the control information may include the first TBS limit. Further, the control information may include a first CSF granularity. For example, because continuous precoding is not applied to the scheduled resources, the CSF granularity may correspond to the size of a PRB. Further, the control information may include a first frequency domain pilot density. Here, because continuous precoding is not applied to the scheduled resources, the first frequency domain pilot density may be set based on the needs of the scheduled entity 1000 for performing a narrowband channel estimate.

On the other hand, if continuous precoding is applied to the scheduled resource, then at block 1112, the scheduling entity 900 may also transmit control information (e.g., DCI) to the scheduled entity 1000. Here, the control information may include scheduling information such as a grant or a resource allocation for a resource including a cluster of one or more RBs, and in some examples, may optionally include an explicit indication to the scheduled entity 1000 that continuous precoding will be applied to an RB cluster. Further, the control information may include the second TBS limit, different from the first TBS limit. Further, the control information may include a second CSF granularity, different from the first CSF granularity. For example, as described above, because continuous precoding is applied to the scheduled resources, the second CSF granularity may correspond to the size of a contiguous resource allocation. In another example, when MU-MIMO is utilized, the second CSF granularity may correspond to the size of each contiguous resource allocation for which the UE pairing does not change (see FIG. 8). Further, the control information may include a second frequency domain pilot density, different from the first frequency domain pilot density. Here, because continuous precoding is applied to the scheduled resources, the second frequency domain pilot density may be set based on the needs of the scheduled entity 1000 for performing a wideband channel estimate.

Further, if continuous precoding is not applied to the scheduled resource, at block 1114, the scheduling entity 900 may transmit signals utilizing the scheduled resources, including, among other things, one or more pilots with a first frequency domain pilot density. Here, the one or more transmitted pilots may be carried in REs within the scheduled resources identified in the DCI transmitted at block 1110. The signals transmitted utilizing the scheduled resources may further include DL traffic, sync signals, broadcast channels, reference signals, or any other suitable information, signals, and/or channels.

On the other hand, if continuous precoding is applied to the scheduled resource, at block 1116, the scheduling entity 900 may transmit signals utilizing the scheduled resources, including, among other things, one or more pilots with a second frequency domain pilot density, different from the first frequency domain pilot density. Here, because continuous precoding is applied and the UE may generate a wideband channel estimate, the second frequency domain pilot density may be lower than the first frequency domain pilot density. The signals transmitted utilizing the scheduled resources may further include DL traffic, sync signals, broadcast channels, reference signals, or any other suitable information, signals, and/or channels.

At the scheduled entity 1000, at block 1118, if continuous precoding is not applied to the scheduled resource, the scheduled entity 1000 may receive the downlink transmission on the scheduled resource and generate one or more narrowband channel estimates. Here, the channel estimate may be based on the first CSF granularity, and the first frequency domain pilot density, as may be signaled in the DCI signaled in block 1110.

On the other hand, if continuous precoding is applied to the scheduled resource, at block 1120, the scheduled entity 1000 may receive the downlink transmission on the scheduled resource and generate one or more wideband channel estimates. Here, the channel estimate may be based on the second CSF granularity, and the second frequency domain pilot density, as signaled in the DCI signaled in block 1112.

After generating the channel estimate, at block 1122, the scheduled entity 1000 may transmit the CSF to the scheduling entity 900.

FIG. 12 is a flow chart illustrating an exemplary process 1200 for the dynamic adjustment of transmission properties with continuous precoding in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 202, the transmitter 302, the base station 602, and/or the scheduling entity 900 described above and illustrated in FIGS. 2, 3, 6, and 9. In some examples, the process 1100 may be carried out by any suitable apparatus or means for carrying out the functions or algorithm described below.

At block 1202, the scheduling entity may allocate resources for wireless communication with a scheduled entity. At block 1204, the scheduling entity may determine whether continuous precoding is applied to the scheduled resources. If continuous precoding is not applied to the scheduled resources, then at block 1206, the scheduling entity may configure one or more transmission parameters for the scheduled resources, other than a precoder, with a first configuration. If continuous precoding is applied to the scheduled resources, then at block 1208, the scheduling entity may configure the one or more transmission parameters for the scheduled resources, other than the precoder, with a second configuration, different from the first configuration. At block 1210, the scheduling entity may transmit control information including a grant for the scheduled resources. Then, at block 1212, the scheduling entity may communicate with the scheduled entity utilizing wireless signals on the scheduled resources.

Figure 13:
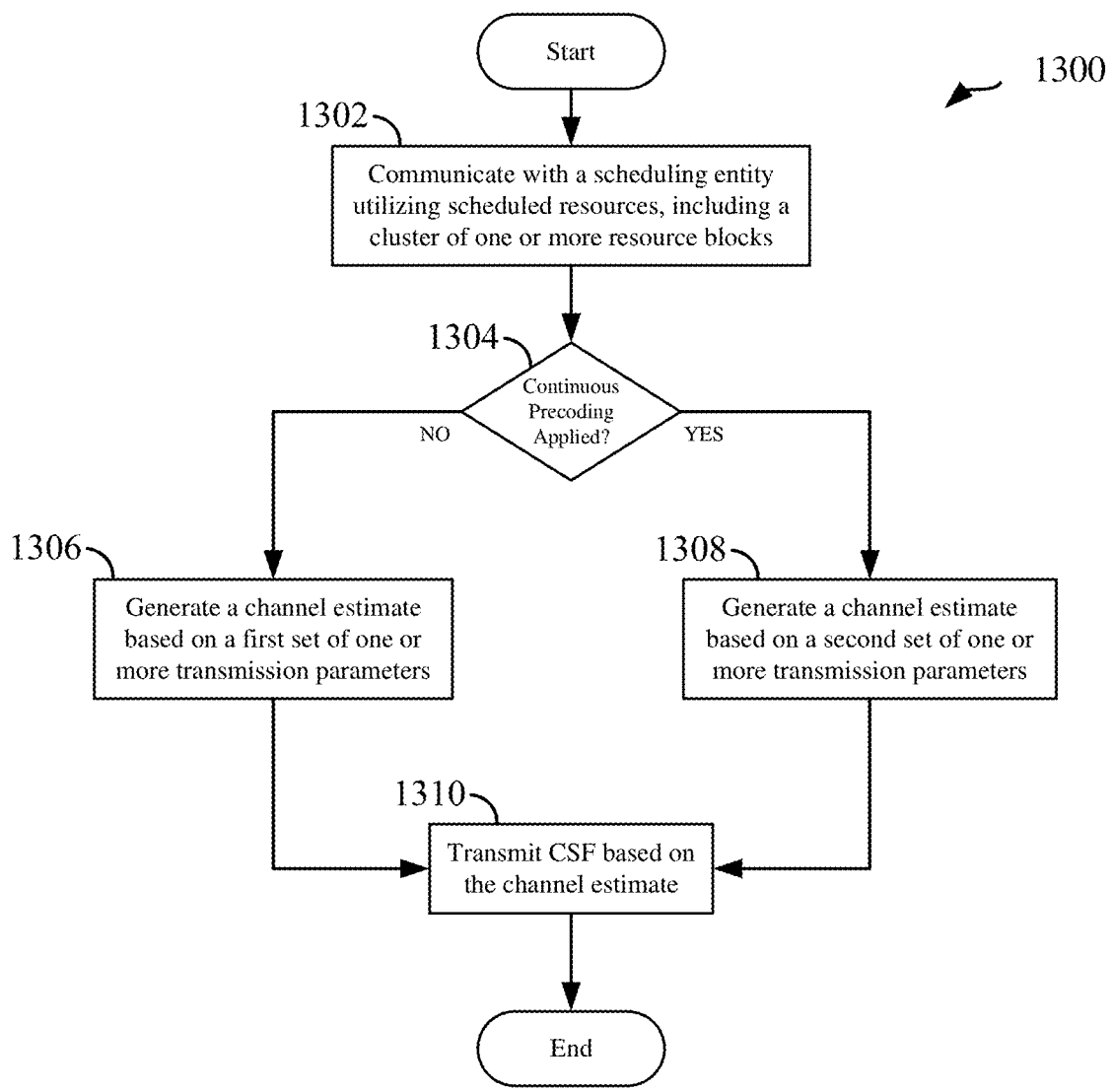
FIG. 13 is a flow chart illustrating an exemplary process for the dynamic adjustment of transmission properties with continuous precoding, operable at a scheduled entity, according to some embodiments.

FIG. 13 is a flow chart illustrating an exemplary process 1300 for the dynamic adjustment of transmission properties with continuous precoding in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity 204, the receiver 306, the UE 604, and/or the scheduled entity 1000 described above and illustrated in FIGS. 2, 3, 6, and 10. In some examples, the process 1100 may be carried out by any suitable apparatus or means for carrying out the functions or algorithm described below.

At block 1302, the scheduled entity may communicate with a scheduling entity utilizing scheduled resources, including a cluster of one or more resource blocks. At block 1304, the scheduled entity may determine if continuous precoding is applied to the scheduled resources. If continuous precoding is not applied to the scheduled resources, then at block 1306, the scheduled entity may generate a channel estimate based on a first set of one or more transmission parameters. If continuous precoding is applied to the scheduled resources, then at block 1308, the scheduled entity may generate a channel estimate based on a second set of one or more transmission parameters, different from the first set. At block 1310, the scheduled entity may transmit CSF based on the generated channel estimate.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduled entity, comprising:
   receiving a transmission from a scheduling entity utilizing scheduled resources comprising a cluster of two or more resource blocks;
   determining whether continuous precoding is applied to the scheduled resources;
   if continuous precoding is not applied to the scheduled resources, generating a channel estimate based on a first set of one or more transmission parameters;
   if continuous precoding is applied to the scheduled resources, generating the channel estimate based on a second set of one or more transmission parameters; and
   processing the transmission based on the channel estimate.

2. The method of claim 1, further comprising:
   receiving downlink control information comprising an explicit indication whether continuous precoding is applied to the scheduled resources.

3. The method of claim 1, wherein the determining whether continuous precoding is applied to the scheduled resources comprises determining whether continuous precoding is applied based on a configuration of the scheduled resources.

4. The method of claim 3, wherein the determining whether continuous precoding is applied to the scheduled resources comprises determining that continuous precoding is applied to the scheduled resources if the two or more resource blocks in the cluster are contiguous, and if the cluster has a bandwidth greater than a minimum threshold bandwidth.

5. The method of claim 3, wherein the determining whether continuous precoding is applied to the scheduled resources comprises determining that continuous precoding is not applied to the scheduled resources if the two or more resource blocks in the cluster are not contiguous and/or if the cluster has a bandwidth not greater than the minimum threshold bandwidth.

6. The method of claim 1,
   wherein the first set of one or more transmission parameters comprises a first frequency domain pilot density; and
   wherein the second set of one or more transmission parameters comprises a second frequency domain pilot density, lower than the first frequency domain pilot density.

7. The method of claim 1, further comprising:
   generating channel state information for each of a plurality of regions of the scheduled resources; and
   transmitting channel state feedback (CSF) based on the channel state information, wherein the plurality of regions corresponds to regions where multiple-user multiple-input multiple-output (MU-MIMO) pairings of scheduled entities do not change, and wherein the CSF comprises the channel state information for each of the plurality of regions.

8. The method of claim 7, further comprising receiving downlink control information (DCI) comprising boundaries of the regions where MIMO pairings of scheduled entities do not change.

9. A scheduled entity configured for wireless communication, comprising:
a processor;
a memory coupled to the processor; and
a transceiver coupled to the processor,
wherein the memory and the processor are configured for:
receiving, via the transceiver, a transmission from a scheduling entity utilizing scheduled resources comprising a cluster of two or more resource blocks;
determining whether continuous precoding is applied to the scheduled resources;
if continuous precoding is not applied to the scheduled resources, generating a channel estimate based on a first set of one or more transmission parameters;
if continuous precoding is applied to the scheduled resources, generating the channel estimate based on a second set of one or more transmission parameters; and
processing the transmission based on the channel estimate.

10. The scheduled entity of claim 9, wherein the memory and the processor are further configured for receiving, via the transceiver, downlink control information comprising an explicit indication whether continuous precoding is applied to the scheduled resources.

11. The scheduled entity of claim 9, wherein the memory and the processor, being configured for determining whether continuous precoding is applied to the scheduled resources, are further configured for determining whether continuous precoding is applied based on a configuration of the scheduled resources.

12. The scheduled entity of claim 11, wherein the memory and the processor, being configured for determining whether continuous precoding is applied to the scheduled resources, are further configured for determining that continuous precoding is applied to the scheduled resources if the two or more resource blocks in the cluster are contiguous, and if the cluster has a bandwidth greater than a minimum threshold bandwidth.

13. The scheduled entity of claim 11, wherein the memory and the processor, being configured for determining whether continuous precoding is applied to the scheduled resources, are further configured for determining that continuous precoding is not applied to the scheduled resources if the two or more resource blocks in the cluster are not contiguous and/or if the cluster has a bandwidth not greater than the minimum threshold bandwidth.

14. The scheduled entity of claim 9,
wherein the first set of one or more transmission parameters comprises a first frequency domain pilot density; and
wherein the second set of one or more transmission parameters comprises a second frequency domain pilot density, lower than the first frequency domain pilot density.

15. The scheduled entity of claim 9, wherein the memory and the processor are further configured for:

generating channel state information for each of a plurality of regions of the scheduled resources; and
transmitting, via the transceiver, channel state feedback (CSF) based on the channel state information,
wherein the plurality of regions corresponds to regions where multiple-user multiple-input multiple-output (MU-MIMO) pairings of scheduled entities do not change, and
wherein the CSF comprises the channel state information for each of the plurality of regions.

16. The scheduled entity of claim 15, wherein the memory and the processor are further configured for receiving, via the transceiver, downlink control information (DCI) comprising boundaries of the regions where MIMO pairings of scheduled entities do not change.

17. A scheduled entity configured for wireless communication, comprising:
means for receiving a transmission from a scheduling entity utilizing scheduled resources comprising a cluster of two or more resource blocks;
means for determining whether continuous precoding is applied to the scheduled resources;
means for, if continuous precoding is not applied to the scheduled resources, generating a channel estimate based on a first set of one or more transmission parameters;
means for, if continuous precoding is applied to the scheduled resources, generating the channel estimate based on a second set of one or more transmission parameters; and
means for processing the transmission based on the channel estimate.

18. The scheduled entity of claim 17, further comprising:
means for receiving downlink control information comprising an explicit indication whether continuous precoding is applied to the scheduled resources.

19. The scheduled entity of claim 17, wherein the means for determining whether continuous precoding is applied to the scheduled resources is further configured for determining whether continuous precoding is applied based on a configuration of the scheduled resources.

20. The scheduled entity of claim 19, wherein the means for determining whether continuous precoding is applied to the scheduled resources is further configured for determining that continuous precoding is applied to the scheduled resources if the two or more resource blocks in the cluster are contiguous, and if the cluster has a bandwidth greater than a minimum threshold bandwidth.

21. The scheduled entity of claim 19, wherein the means for determining whether continuous precoding is applied to the scheduled resources is further configured for determining that continuous precoding is not applied to the scheduled resources if the two or more resource blocks in the cluster are not contiguous and/or if the cluster has a bandwidth not greater than the minimum threshold bandwidth.

22. The scheduled entity of claim 17,
wherein the first set of two or more transmission parameters comprises a first frequency domain pilot density; and
wherein the second set of one or more transmission parameters comprises a second frequency domain pilot density, lower than the first frequency domain pilot density.

23. The scheduled entity of claim 17, further comprising:
means for generating channel state information for each of a plurality of regions of the scheduled resources; and means for transmitting channel state feedback (CSF) based on the channel state information,
wherein the plurality of regions corresponds to regions where multiple-user multiple-input multiple-output (MU-MIMO) pairings of scheduled entities do not change, and
wherein the CSF comprises the channel state information for each of the plurality of regions.

24. The scheduled entity of claim 23, further comprising means for receiving downlink control information (DCI) comprising boundaries of the regions where MIMO pairings of scheduled entities do not change.

25. A non-transitory computer-readable medium storing computer-executable code, comprising code for causing a scheduled entity to:
receive a transmission from a scheduling entity utilizing scheduled resources comprising a cluster of two or more resource blocks;
determine whether continuous precoding is applied to the scheduled resources;
if continuous precoding is not applied to the scheduled resources, generate a channel estimate based on a first set of one or more transmission parameters;
if continuous precoding is applied to the scheduled resources, generate the channel estimate based on a second set of one or more transmission parameters; and
process the transmission based on the channel estimate.

26. The non-transitory computer-readable medium of claim 25, further comprising code for causing a scheduled entity to receive downlink control information comprising an explicit indication whether continuous precoding is applied to the scheduled resources.

27. The non-transitory computer-readable medium of claim 25, wherein the code for causing a scheduled entity to determine whether continuous precoding is applied to the scheduled resources is further configured to determine that continuous precoding is applied to the scheduled resources if the two or more resource blocks in the cluster are contiguous, and if the cluster has a bandwidth greater than a minimum threshold bandwidth.

28. The non-transitory computer-readable medium of claim 25, wherein the code for causing a scheduled entity to determine whether continuous precoding is applied to the scheduled resources is further configured to determine that continuous precoding is not applied to the scheduled resources if the two or more resource blocks in the cluster are not contiguous and/or if the cluster has a bandwidth not greater than the minimum threshold bandwidth.

29. The non-transitory computer-readable medium of claim 25,
wherein the first set of one or more transmission parameters comprises a first frequency domain pilot density; and
wherein the second set of one or more transmission parameters comprises a second frequency domain pilot density, lower than the first frequency domain pilot density.

30. The non-transitory computer-readable medium of claim 25, further comprising code for causing a scheduled entity to:
generate channel state information for each of a plurality of regions of the scheduled resources;
transmit channel state feedback (CSF) based on the channel state information; and
receive downlink control information (DCI) comprising boundaries of the regions where MIMO pairings of scheduled entities do not change,
wherein the plurality of regions corresponds to regions where multiple-user multiple-input multiple-output (MU-MIMO) pairings of scheduled entities do not change, and
wherein the CSF comprises the channel state information for each of the plurality of regions.

\* \* \* \* \*